US010771126B2

United States Patent
Chu et al.

(10) Patent No.: US 10,771,126 B2
(45) Date of Patent: Sep. 8, 2020

(54) UPLINK MULTI-USER MULTIPLE INPUT MULTIPLE OUTPUT FOR WIRELESS LOCAL AREA NETWORK

(71) Applicant: Marvell World Trade Ltd., St. Michael (BB)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 15/818,552

(22) Filed: Nov. 20, 2017

(65) Prior Publication Data

US 2018/0076860 A1 Mar. 15, 2018

Related U.S. Application Data

(63) Continuation of application No. 14/553,982, filed on Nov. 25, 2014, now Pat. No. 9,825,678.
(Continued)

(51) Int. Cl.
*H04B 7/212* (2006.01)
*H04B 7/0452* (2017.01)
(Continued)

(52) U.S. Cl.
CPC ......... *H04B 7/0452* (2013.01); *H04L 1/1621* (2013.01); *H04L 1/1685* (2013.01);
(Continued)

(58) Field of Classification Search
CPC ..... H04L 1/0048; H04B 7/024; H04B 7/0413; H04B 7/0452; H04B 7/0495
See application file for complete search history.

(56) References Cited

U.S. PATENT DOCUMENTS 5,933,787 A 8/1999 Gilhousen et al.
6,175,743 B1 1/2001 Alperovich et al.
(Continued)

FOREIGN PATENT DOCUMENTS

CN 103503553 A 1/2014
CN 104038981 A 9/2014
(Continued)

OTHER PUBLICATIONS

Bejarano, "IEEE 802.11ac: from channelization to multi-user MIMO," IEEE Communications Magazine, IEEE Service Center, vol. 51 No. 10, pp. 84-90 (Oct. 1, 2013).
(Continued)

*Primary Examiner* — Bo Hui A Zhu

(57) ABSTRACT

A first communication device transmits a first communication frame that includes scheduling information corresponding to a time period in which an uplink multi-user transmission is to occur. The scheduling information indicates a start time of the time period. The first communication frame includes an indication of a group of two or more second communication devices that are to transmit simultaneously during the time period as part of the uplink multi-user transmission. The first communication device transmits a second communication frame during the time period. The second communication frame is configured to trigger at least some second communication device in the group of two or more second communication devices to transmit simultaneously as part of the uplink multi-user transmission. The first communication device receives the uplink multi-user transmission during the time period, the uplink multi-user transmission being responsive to the second communication frame.

23 Claims, 11 Drawing Sheets

Related U.S. Application Data

(60) Provisional application No. 61/909,024, filed on Nov. 26, 2013.

(51) Int. Cl.
  *H04L 1/18* (2006.01)
  *H04L 5/00* (2006.01)
  *H04W 72/12* (2009.01)
  *H04L 1/16* (2006.01)
  *H04W 72/04* (2009.01)
  *H04W 76/40* (2018.01)
  *H04W 84/12* (2009.01)
  *H04L 1/00* (2006.01)

(52) U.S. Cl.
  CPC .......... *H04L 1/1854* (2013.01); *H04L 1/1887* (2013.01); *H04L 5/0023* (2013.01); *H04L 5/0055* (2013.01); *H04W 72/0413* (2013.01); *H04W 72/1289* (2013.01); *H04L 1/1614* (2013.01); *H04L 2001/0093* (2013.01); *H04W 72/121* (2013.01); *H04W 76/40* (2018.02); *H04W 84/12* (2013.01)

(56) References Cited

U.S. PATENT DOCUMENTS

| | | |
|---|---|---|
| 6,377,813 B1 | 4/2002 | Kansakoski et al. |
| 6,519,229 B1 | 2/2003 | Arai et al. |
| 6,947,388 B1 | 9/2005 | Wagner |
| 6,947,748 B2 | 9/2005 | Li et al. |
| 7,599,332 B2 | 10/2009 | Zelst et al. |
| 7,742,390 B2 | 6/2010 | Mujtaba |
| 7,804,800 B2 | 9/2010 | Li et al. |
| 7,917,107 B2 | 3/2011 | Gu et al. |
| 8,144,647 B2 | 3/2012 | Nabar et al. |
| 8,149,811 B2 | 4/2012 | Nabar et al. |
| 8,155,138 B2 | 4/2012 | van Nee |
| 8,194,604 B2 | 6/2012 | Gault et al. |
| 8,270,909 B2 | 9/2012 | Zhang et al. |
| 8,289,869 B2 | 10/2012 | Sawai |
| 8,363,578 B1 | 1/2013 | Ramamurthy et al. |
| 8,395,997 B2 | 3/2013 | Banerjea et al. |
| 8,472,383 B1 | 6/2013 | Banerjea et al. |
| 8,526,351 B2 | 9/2013 | Fischer et al. |
| 8,571,010 B1 | 10/2013 | Zhang et al. |
| 8,599,803 B1 | 12/2013 | Zhang et al. |
| 8,619,907 B2 | 12/2013 | Mujtaba et al. |
| 8,644,368 B1 | 2/2014 | Zhang et al. |
| 8,660,497 B1 | 2/2014 | Zhang et al. |
| 8,670,399 B2 | 3/2014 | Liu et al. |
| 8,675,575 B2 | 3/2014 | Gong et al. |
| 8,724,546 B2 | 5/2014 | Zhang et al. |
| 8,724,720 B2 | 5/2014 | Srinivasa et al. |
| 8,737,405 B2 | 5/2014 | Liu et al. |
| 8,743,784 B2 | 6/2014 | Sampath et al. |
| 8,787,338 B2 | 7/2014 | Liu et al. |
| 8,787,385 B2 | 7/2014 | Liu et al. |
| 8,811,203 B1 | 8/2014 | Liu et al. |
| 8,855,053 B2 | 10/2014 | Chen et al. |
| 8,886,755 B1 | 11/2014 | Liu et al. |
| 8,891,640 B2 | 11/2014 | Nabar et al. |
| 8,923,118 B1 | 12/2014 | Liu et al. |
| 8,971,264 B2 | 3/2015 | Kwon et al. |
| 8,971,350 B1 | 3/2015 | Liu |
| 8,976,877 B2 | 3/2015 | Stacey et al. |
| 9,161,362 B1 | 10/2015 | Banerjea et al. |
| 9,166,660 B2 | 10/2015 | Chu et al. |
| 9,215,055 B2 | 12/2015 | Chu et al. |
| 9,226,294 B1 | 12/2015 | Liu et al. |
| 9,237,538 B1 | 1/2016 | Zhang et al. |
| 9,456,446 B1 | 9/2016 | Liu et al. |
| 9,473,341 B2 | 10/2016 | Zhang et al. |
| 9,717,086 B2 | 7/2017 | Zhang et al. |
| 9,825,678 B2 | 11/2017 | Chu et al. |
| 9,844,076 B1 | 12/2017 | Liu et al. |
| 9,853,791 B2 | 12/2017 | Chu et al. |
| 2002/0061768 A1 | 5/2002 | Liang et al. |
| 2002/0098860 A1 | 7/2002 | Pecen et al. |
| 2002/0145985 A1 | 10/2002 | Love et al. |
| 2003/0064728 A1 | 4/2003 | Speight |
| 2003/0128684 A1 | 7/2003 | Hirsch et al. |
| 2004/0001429 A1 | 1/2004 | Ma et al. |
| 2004/0057530 A1 | 3/2004 | Tarokh et al. |
| 2004/0066766 A1 | 4/2004 | Shiu et al. |
| 2005/0044473 A1 | 2/2005 | Huang et al. |
| 2005/0058151 A1 | 3/2005 | Yeh |
| 2005/0135284 A1 | 6/2005 | Nanda et al. |
| 2005/0135318 A1 | 6/2005 | Walton et al. |
| 2005/0226198 A1 | 10/2005 | Barak et al. |
| 2006/0014554 A1 | 1/2006 | Gerlach |
| 2006/0023669 A1 | 2/2006 | Yamaura et al. |
| 2006/0045048 A1 | 3/2006 | Kwon et al. |
| 2006/0120395 A1 | 6/2006 | Xing et al. |
| 2007/0004440 A1 | 1/2007 | Breuer et al. |
| 2007/0017754 A1 | 1/2007 | Kakinuma et al. |
| 2007/0060149 A1 | 3/2007 | Lim et al. |
| 2007/0060168 A1 | 3/2007 | Benveniste |
| 2007/0086370 A1 | 4/2007 | Jang et al. |
| 2007/0171808 A1 | 7/2007 | Wu et al. |
| 2007/0177541 A1 | 8/2007 | Kwon et al. |
| 2007/0206534 A1 | 9/2007 | Kwun et al. |
| 2007/0223469 A1 | 9/2007 | Chandra et al. |
| 2007/0237181 A1 | 10/2007 | Cho et al. |
| 2008/0075058 A1 | 3/2008 | Mundarath et al. |
| 2008/0084837 A1 | 4/2008 | Watanabe et al. |
| 2008/0084941 A1 | 4/2008 | Mohanty et al. |
| 2008/0117867 A1 | 5/2008 | Yin et al. |
| 2008/0119194 A1 | 5/2008 | Kim et al. |
| 2008/0130483 A1 | 6/2008 | Khandekar et al. |
| 2008/0192644 A1 | 8/2008 | Utsunomiya et al. |
| 2008/0292015 A1 | 11/2008 | Lee |
| 2008/0310363 A1 | 12/2008 | McBeath et al. |
| 2008/0316961 A1 | 12/2008 | Bertrand et al. |
| 2008/0318612 A1 | 12/2008 | Axnas et al. |
| 2009/0022093 A1 | 1/2009 | Nabar et al. |
| 2009/0022128 A1 | 1/2009 | Nabar et al. |
| 2009/0059792 A1* | 3/2009 | Itoh ............... H04W 28/26 370/235 |
| 2009/0066577 A1 | 3/2009 | Kim et al. |
| 2009/0129304 A1 | 5/2009 | Kim et al. |
| 2009/0196163 A1 | 8/2009 | Du |
| 2009/0225710 A1 | 9/2009 | Gupta et al. |
| 2009/0232234 A1 | 9/2009 | Du |
| 2009/0262696 A1 | 10/2009 | Wei et al. |
| 2009/0316585 A1 | 12/2009 | Srinivasan et al. |
| 2010/0029325 A1 | 2/2010 | Wang et al. |
| 2010/0046358 A1 | 2/2010 | van Nee |
| 2010/0046656 A1 | 2/2010 | van Nee et al. |
| 2010/0061333 A1 | 3/2010 | Marsh et al. |
| 2010/0061334 A1 | 3/2010 | Gault et al. |
| 2010/0067589 A1 | 3/2010 | Schumacher et al. |
| 2010/0091675 A1 | 4/2010 | Sawai |
| 2010/0118829 A1 | 5/2010 | Lin et al. |
| 2010/0165959 A1 | 7/2010 | Park et al. |
| 2010/0177757 A1 | 7/2010 | Kim et al. |
| 2010/0220601 A1 | 9/2010 | Vermani et al. |
| 2010/0220679 A1* | 9/2010 | Abraham ............... H04W 74/06 370/329 |
| 2010/0246498 A1 | 9/2010 | Lim et al. |
| 2010/0250159 A1 | 9/2010 | Hall |
| 2010/0309834 A1 | 12/2010 | Fischer et al. |
| 2010/0309868 A1 | 12/2010 | Yang et al. |
| 2010/0316150 A1 | 12/2010 | Amini et al. |
| 2011/0002219 A1 | 1/2011 | Kim et al. |
| 2011/0038332 A1 | 2/2011 | Liu et al. |
| 2011/0053527 A1 | 3/2011 | Hunzinger |
| 2011/0090855 A1 | 4/2011 | Kim |
| 2011/0096796 A1 | 4/2011 | Zhang et al. |
| 2011/0096797 A1 | 4/2011 | Zhang et al. |
| 2011/0116485 A1 | 5/2011 | Olszewski et al. |
| 2011/0128900 A1 | 6/2011 | Seok |
| 2011/0128929 A1 | 6/2011 | Liu et al. |
| 2011/0128947 A1 | 6/2011 | Liu et al. |

(56) References Cited

U.S. PATENT DOCUMENTS

| | | | |
|---|---|---|---|
| 2011/0164597 A1 | 7/2011 | Amini et al. | |
| 2011/0194644 A1 | 8/2011 | Liu et al. | |
| 2011/0235596 A1 | 9/2011 | Wentink | |
| 2011/0268054 A1 | 11/2011 | Abraham et al. | |
| 2011/0305178 A1 | 12/2011 | Zheng et al. | |
| 2011/0310827 A1 | 12/2011 | Srinivasa et al. | |
| 2012/0033753 A1 | 2/2012 | Hamaguchi | |
| 2012/0039196 A1 | 2/2012 | Zhang | |
| 2012/0044906 A1 | 2/2012 | Chen et al. | |
| 2012/0057471 A1 | 3/2012 | Amini et al. | |
| 2012/0082040 A1 | 4/2012 | Gong et al. | |
| 2012/0201315 A1 | 8/2012 | Zhang et al. | |
| 2012/0275409 A1 | 11/2012 | Han et al. | |
| 2013/0229996 A1 | 9/2013 | Wang et al. | |
| 2013/0259017 A1 | 10/2013 | Zhang et al. | |
| 2013/0286959 A1 | 10/2013 | Lou et al. | |
| 2013/0301551 A1 | 11/2013 | Ghosh et al. | |
| 2013/0315139 A1 | 11/2013 | Abraham et al. | |
| 2014/0050173 A1 | 2/2014 | Yang et al. | |
| 2014/0269964 A1 | 9/2014 | Du et al. | |
| 2014/0314004 A1 | 10/2014 | Zhou et al. | |
| 2015/0043625 A1 | 2/2015 | Gomez et al. | |
| 2015/0049727 A1 | 2/2015 | Wentink et al. | |
| 2015/0063190 A1* | 3/2015 | Merlin | H04L 5/0037 370/312 |
| 2015/0063255 A1 | 3/2015 | Tandra et al. | |
| 2015/0117227 A1 | 4/2015 | Zhang et al. | |
| 2015/0131517 A1 | 5/2015 | Chu et al. | |
| 2015/0146653 A1 | 5/2015 | Zhang et al. | |
| 2015/0146654 A1 | 5/2015 | Chu et al. | |
| 2015/0146807 A1 | 5/2015 | Zhang et al. | |
| 2015/0146808 A1 | 5/2015 | Chu et al. | |
| 2015/0146812 A1 | 5/2015 | Chu et al. | |
| 2015/0181620 A1 | 6/2015 | Seok | |
| 2016/0029373 A1 | 1/2016 | Seok | |
| 2016/0088628 A1 | 3/2016 | Zhang et al. | |
| 2016/0164654 A1 | 6/2016 | Huang et al. | |
| 2016/0242187 A1 | 8/2016 | Zhang et al. | |
| 2016/0323879 A1 | 11/2016 | Ghosh et al. | |
| 2016/0373559 A1 | 12/2016 | Nabetani et al. | |
| 2017/0041174 A1 | 2/2017 | Zhang et al. | |
| 2017/0111096 A1 | 4/2017 | Nabetani | |
| 2017/0202026 A1 | 7/2017 | Ahn et al. | |
| 2017/0279864 A1 | 9/2017 | Chun et al. | |
| 2017/0325233 A1 | 11/2017 | Zhang et al. | |

FOREIGN PATENT DOCUMENTS

| | | |
|---|---|---|
| EP | 907263 A2 | 4/1999 |
| EP | 1168877 | 1/2002 |
| JP | 10136446 | 5/1998 |
| JP | 11069426 | 3/1999 |
| JP | 2013-522968 A | 6/2013 |
| WO | WO-2007/081683 | 7/2007 |
| WO | WO-2008/025040 A2 | 2/2008 |
| WO | WO-2011/035204 A2 | 3/2011 |
| WO | WO-2011/130344 | 10/2011 |
| WO | WO-2012/051319 | 4/2012 |
| WO | WO-2012/111939 A2 | 8/2012 |
| WO | WO-2012/173326 | 12/2012 |

OTHER PUBLICATIONS

Kumaran, "Uplink Scheduling in CDMA Packet-Data Systems," Journal Wireless Networks, vol. 12, Issue 1, pp. 33-43 (Feb. 2006).
IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).
International Preliminary Report on Patentability in International Application No. PCT/US2014/067583, dated Jun. 9, 2016 (16 pages).
Office Action in U.S. Appl. No. 14/955,004, dated May 2, 2018 (25 pages).
3GPP TS 36.213, V8.5.0, "3rd Generation Partnership Project; Technical Specification Group Radio Access Network; Evolved Universal Terrestrial Radio Access (E-UTRA); Physical layer procedures (Release 8)," *3rd Generation Partnership Project*, 76 pages (Dec. 2008).
Ansari et al., "Unified MIMO Pre-Coding Based on Givens Rotation," *The Institute of Electrical and Electronics Engineers*, pp. 1-13, (Jan. 11, 2005).
Cariou et al., "Multi-channel Transmissions," *The Institute of Electrical and Electronics Engineers, Inc.*, pp. 1-13 (Sep. 2009).
Chen, "Home Network Basis: Transmission Environments and Wired/Wireless Protocols," Prentice Hall, pp. 1-26 (Jul. 2003).
Chu et al., "Medium Access Protection and Bandwidth Negotiation in a Wireless Local Area Network," U.S. Appl. No. 14/555,305, dated Nov. 26, 2014 (74 pages).
Eslami et al., "Net Throughput Maximization of Per-Chunk User Scheduling for MIMO-OFDM Downlink," *IEEE Transactions on Vehicular Technology*, vol. 60, No. 9, pp. 4338-4348 (Nov. 2011).
Hiertz et al., "The IEEE 802.11 Universe," *IEEE Communications Magazine*, pp. 62-70, (Jan. 2010).
IEEE 802.20-PD-06; IEEE p. 802.20™V14, Draft 802.20 Permanent Document; <System Requirements for IEEE 802.20 Mobile Broadband Wireless Access Systems—Version 14>, 24 pages (Jul. 16, 2004).
IEEE P802.11n™ D3.00, "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).
IEEE P802.16Rev2/D5 (Jul. 2008) (Revision of IEEE Std 802.16/ 2004 and consolidates material from IEEE Std 802.16e-2005, Std 802.16/2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).
IEEE Std 802.Nov. 2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).
IEEE Std 802.11a-1999 (R2003) (Supplement to IEEE Std 802.11- 1999) "Supplement to IEEE Standard for Information technology— Telecommunications and information exchange between systems— Local and metropolitan area networks Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, pp. 1-92, (1999) Reaffirmed (Jun. 12, 2003).
IEEE Std 802.11a-1999 (Supplement to IEEE Std 802.11-1999) "Supplement to IEEE Standard for Information technology— Telecommunications and information exchange between systems— Local and metropolitan area networks—Specific requirements— Part 11: Wireless LAN Medium Access Control (MAC) and Physical Layer (PHY) specifications: High-Speed Physical Layer in the 5 Ghz Band," *The Institute of Electrical and Electronics Engineers, Inc.*, pp. 1-83 (Sep. 1999).
IEEE Std 802.11ac/D2.0 "Draft Standard for Information Technology— Telecommunications and information exchange between systems— Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

(56) References Cited

OTHER PUBLICATIONS

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).
IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 Ghz Band," *The Institute of Electrical and Electronics Engineers, Inc.*, pp. 1-89 (Sep. 1999).
IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).
IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements, "*The Institute of Electrical and Electronics Engineers, Inc.*, pp. 1-196 (Oct. 2004).
IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).
IEEE Std 802.11g/D8.2, Apr 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).
IEEE Std 802.11™ 2012 (Revision of IEEE Std 802.Nov. 2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std 802.16/2004 (Revision of IEEE Std 802.16/2001), "IEEE Standard for Local and metropolitan area networks; Part 16: Air Interface for Fixed Broadband Wireless Access Systems," The Institute of Electrical and Electronics Engineers, Inc., 893 pages (Oct. 1, 2004).
IEEE Std 802.16/2009 (Revision of IEEE Std. 802.16/2004), IEEE Standard for Local and metropolitan area networks: Part 16: Air Interface for Broadband Wireless Access Systems, The Institute of Electrical and Electronics Engineers, Inc., 2082 pages (May 29, 2009).
IEEE Std 802.16e-2005 and IEEE Std 802.16/2004/Cor1-2005 (Amendment and Corrigendum to IEEE Std 802.16/2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, The Institute of Electrical and Electronics Engineers, Inc. pp. 1-864 (Feb. 28, 2006).
IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).
IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

(56) References Cited

OTHER PUBLICATIONS

International Search Report and Written Opinion in International Application No. PCT/US2014/067583, dated May 12, 2015 (21 pages).
International Search Report and Written Opinion in International Application No. PCT/US2014/067596, dated Feb. 20, 2015 (12 pages).
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).
Invitation to Pay Additional Fees and Partial International Search Report for International Application No. PCT/US2014/067583, dated Mar. 6, 2015 (8 pages).
Jang, et al., "Frame Design and Throughput Evaluatioln for Practice Multiuser MIMO OFDMA Systems," *IEEE Transactions on Vehicular Technology*, vol. 60, No. 7, pp. 3127-3141 (Sep. 2011).
Lestable, et al., "Uplink MIMO Schemes for 802.16m," IEEE 802.16 Broadband Wireless Access Working Group, IEEE C802.16m-08/534, 18 pages (Jul. 7, 2008).
Liu, et al., "Donwlink MIMO in LTE-Advanced: *SU-MIMO* vs. *MU-MIMO*," LTE Advance and 4G Wireless Communications, *IEEE Communications Magazine*, pp. 140-147 (Feb. 2012).
Liu, et al.,"VHT BSS Channel Selection," *Institute of Electrical and Electronics Engineers, Inc.*, doc. No. IEEE 802.11-11/1433r0, pp. 1-10 (Nov. 2011).
Love et al., "An Overview of Limited Feedback in Wireless Communication Systems," IEEE J. On Selected Areas in Communications, vol. 26, No. 8, pp. 1341-1365 (Oct. 2008).
Mujtaba, S.A. "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).
Noh, et al., "Channel Selection and Management for 11ac," Doc. No. IEEE 802.11-10/0593r1, *The Institute of Electrical and Electronics Engineers, Inc.*, pp. 1-21 (May 20, 2010).
Park, "IEEE 802.11ac: Dynamic Bandwidth Channel Access," 2011 IEEE Int'l Conf. on Communications (ICC), pp. 1-5 (Jun. 2011).
Pedersen et al., "Carrier Aggregation for LTE-Advanced: Functionality and Performance Aspects," IEEE Communications Magazine, vol. 49, No. 6, pp. 89-95, (Jun. 1, 2011).
Perahia et al., "Gigabit Wireless LANs: an overview of IEEE 802.11ac and 80211ad," ACM Sigmobile Mobile Computing and Communications Review, vo. 15, No. 3, pp. 23-33 (Jul. 2011).
Redieteab, et al., "Cross-Layer Multichannel Aggregation for Future Wlan Systems," 2010 IEEE Int'l Conf. on Communication Systems (ICCS), pp. 740-756 (Nov. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-46 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-11 (2009).
Tandai, et al., "An efficient uplink multiuser MIMO protocol in IEEE 802.11 WLANs," IEEE 20th International Symposium on Personal, Indoor and Mobile Radio Communications (PIMRC 2009), pp. 1153-1157 (Sep. 13, 2009).
van Nee et al. "The 802.11n MIMO-OFDM Standard for Wireless LAN and Beyond," Wireless Personal Communications, vol. 37, pp. 445-453 (Jun. 2006).
Wannstrom, "Carrier Aggregation explained," pp. 1-6 (May 2012).
Yuan et al., "Carrier Aggregation for LTE-Advanced Mobile Communication Systems," *IEEE Communications Magazine*, pp. 88-93 (Feb. 2010).
Zhang et al., "Applying Antenna Selection in WLANs for Achieving Broadband Multimedia Communications," *IEEE Trans. on Broadcasting*, vol. 52, No. 4, pp. 475-482 (Dec. 2006).
U.S. Appl. No. 61/227,356, Zhang et al., "Uplink Multiuser MIMO in WLAN," filed Jul. 21, 2009 (36 pages).
U.S. Appl. No. 12/730,651, Zhang, et al, "OFDMA with Block Tone Assignment for WLAN," filed Mar. 24, 2010.
Chun et al., "Legacy Support on HEW frame structure," doc: IEEE 11-13/1057r0, *The Institute of Electrical and Electronics Engineers, Inc.*, pp. 1-8 (Sep. 2013).
Seok et al., "HEW PPDU Format for Supporting MIMO-OFDMA," IEEE 802.11-14/1210r0, 16 pages, (Sep. 14, 2014).
Hart, et al., "DL-OFDMA for Mixed Clients," IEEE 802.11-10/0317r1, 24 pages (Mar. 6, 2010).
Search Report in Chinese Patent Application No. 201480073248.9, sent with Office Action dated Aug. 29, 2018 (3 pages).
Office Action in Chinese Patent Application No. 201480073248.9, dated Aug. 29, 2018, with English translation (14 pages).
Kwon et al., "SIG Structure for UL PPDU," IEEE Draft, doc. IEEE 802.11-15/0574r0, vol. 802.11ax, 18 pages (May 11, 2015).
Merlin et al., "Trigger Frame Format," IEEE Draft, doc. IEEE 802.11-15/0877r1, vol. 802.11ax, No. 1, 16 pages (Jul. 13, 2015).
Notice of Reasons for Refusal in Japanese Patent Application No. 2016-535139, dated Oct. 12, 2018, with English translation (6 pages).
Second Office Action in Chinese Patent Application No. 201480073248.9, dated May 7, 2019, with English translation (14 pages).
Notice of Allowance in U.S. Appl. No. 14/955,004, dated Sep. 26, 2018 (10 pages).
Office Action in Chinese Patent Application No. 201480073248.9, dated Jan. 2, 2020, with English translation (7 pages).

* cited by examiner

UPLINK MULTI-USER MULTIPLE INPUT MULTIPLE OUTPUT FOR WIRELESS LOCAL AREA NETWORK

CROSS-REFERENCES TO RELATED APPLICATIONS

This application is a continuation of U.S. patent application Ser. No. 14/553,982, now U.S. Pat. No. 9,825,678, entitled "Uplink Multi-User Multiple Input Multiple Output for Wireless Local Area Network," filed on Nov. 25, 2014, which claims the benefit of U.S. Provisional Patent Application No. 61/909,024, entitled "UL MU MIMO MAC Consideration," filed on Nov. 26, 2013. This application is also related to U.S. patent application Ser. No. 14/955,004, entitled "Uplink Multi-User Multiple Input Multiple Output for Wireless Local Area Network," filed on Nov. 30, 2015. All of the applications referenced above are incorporated herein by reference in their entireties.

FIELD OF THE DISCLOSURE

The present disclosure relates generally to communication networks and, more particularly, to wireless local area networks that utilize multiple input multiple output techniques.

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method includes: transmitting, by a first communication device, a first communication frame that includes scheduling information corresponding to a time period in which an uplink multi-user transmission is to occur, wherein the scheduling information indicates a start time of the time period, and wherein the first communication frame includes an indication of a group of two or more second communication devices that are to transmit simultaneously during the time period as part of the uplink multi-user transmission; transmitting, by the first communication device, a second communication frame during the time period, wherein the second communication frame is configured to trigger at least some second communication device in the group of two or more second communication devices to transmit simultaneously as part of the uplink multi-user transmission; and receiving, at the first communication device, the uplink multi-user transmission during the time period, wherein the uplink multi-user transmission is responsive to the second communication frame and includes respective simultaneous individual transmissions from respective second communication devices among the group of two or more second communication devices.

In another embodiment, an apparatus comprises a network interface device that includes: one or more integrated circuit (IC) devices, and a plurality of transceivers implemented at least partially on the one or more IC devices. The one or more IC devices are configured to: transmit a first communication frame that includes scheduling information corresponding to a time period in which an uplink multi-user transmission is to occur, wherein the scheduling information indicates a start time of the time period, and wherein the first communication frame includes an indication of a group of two or more second communication devices that are to transmit simultaneously during the time period as part of the uplink multi-user transmission; transmit a second communication frame during the time period, wherein the second communication frame is configured to trigger at least some second communication device in the group of two or more second communication devices to transmit simultaneously as part of the uplink multi-user transmission; and receive the uplink multi-user transmission during the time period, wherein the uplink multi-user transmission is responsive to the second communication frame and includes respective simultaneous individual transmissions from respective second communication devices among the group of two or more second communication devices.

DETAILED DESCRIPTION

In embodiments described below, a first communication device, such as an access point (AP) of a wireless local area network (WLAN), simultaneously receives multiple independent data streams from multiple second communication devices, such as client stations. The first communication device determines that the second communication devices have data to transmit to the first communication device. Then, the first communication device prompts the second communication devices to simultaneously transmit the data streams during a transmit opportunity period (TXOP) of the first communication device. In an embodiment, a TXOP is a bounded time interval reserved for a communication device in a network during which the communication device can send as many frames as possible (as long as the duration of the transmissions does not extend beyond the PPDU length defined by the first communication device and beyond the TXOP). In an embodiment, other communication devices are generally not permitted to transmit in the TXOP unless the communication device to which the TXOP is assigned specifically permits the other communication device to transmit or unless the other communication device is acknowledging a transmission of the communication device to which the TXOP is assigned.

Figure 1:
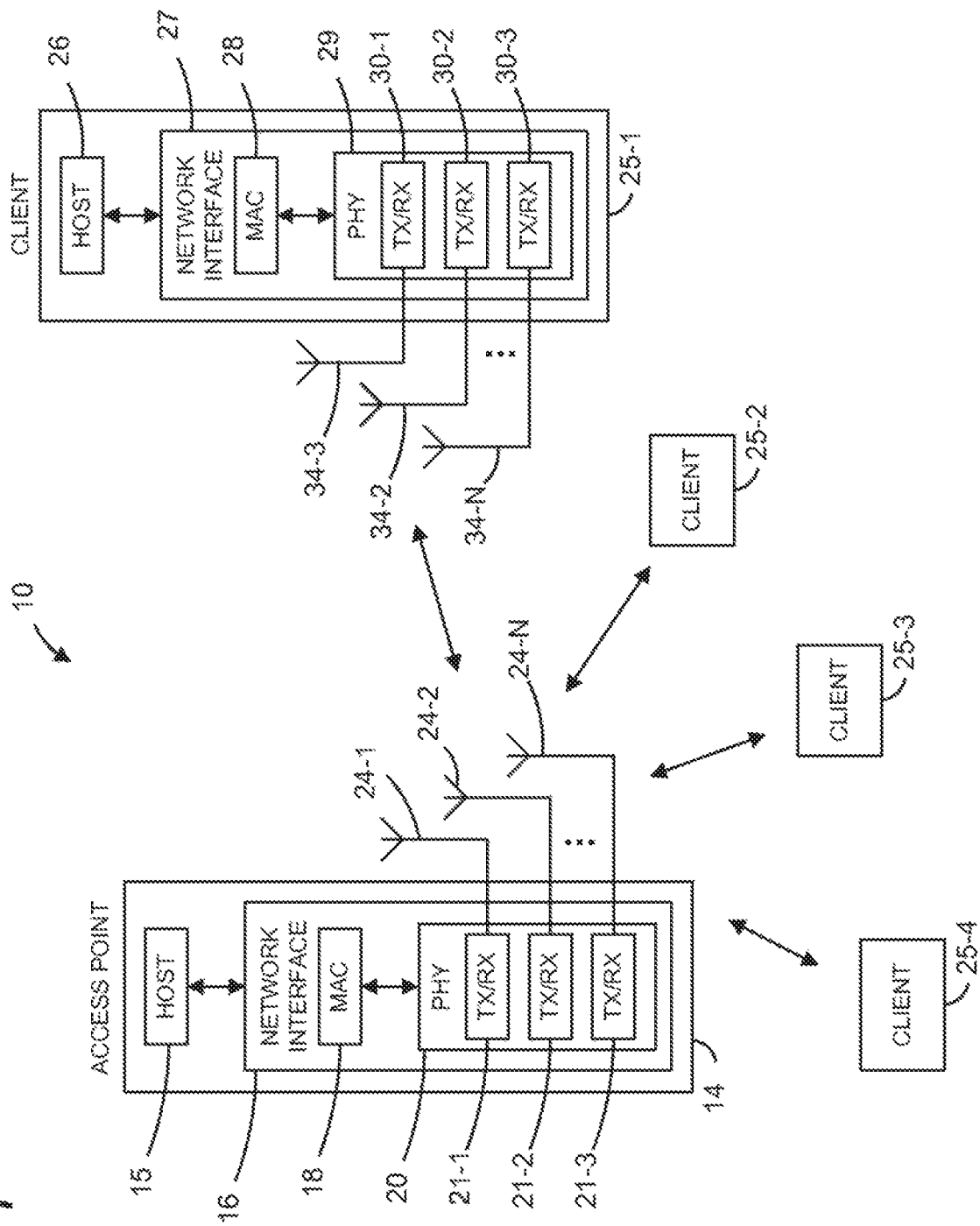
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. In some embodiments, the AP 14 is configured to transmit independent data to two or more of the client stations 25 simultaneously. In one such embodiment, the two or more client stations 25 are members of a client uplink group created by the AP and identified by a group identifier. In other embodiments, the AP 14 is configured, additionally or alternatively, to receive respective data streams that are transmitted simultaneously by the two or more client stations 25. In an embodiment, the two or more client stations 25 that transmit simultaneously are members of the client uplink group. In one embodiment, for example, the network interface 16 is configured to transmit independent data simultaneously to multiple client stations 25 via multiple spatial streams using techniques described in U.S. patent application Ser. No. 12/175,526, entitled "Access Point with Simultaneous Downlink Transmission of Independent Data for Multiple Client Stations," filed on Jul. 18, 2008, which is hereby incorporated by reference. As another example, in another embodiment, the network interface 16, additionally or alternatively, is configured to receive independent data streams transmitted simultaneously by multiple client stations 25 via different spatial streams using techniques described in U.S. patent application Ser. No. 12/175,501, entitled "Wireless Network with Simultaneous Uplink Transmission of Independent Data from Multiple Client Stations," filed on Jul. 18, 2008, which is hereby incorporated by reference.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In some embodiments, two or more of the client stations 25 are configured to receive respective data streams that are transmitted simultaneously by the AP 14. In an embodiment, the client stations 25 are members of the client uplink group. In other embodiments, two or more of the client stations 25 additionally or alternatively are configured to transmit corresponding data streams to the AP 14 such that the AP 14 receives the data streams simultaneously. For example, in one embodiment, the network interface 27 is configured to receive a data stream among a plurality of independent data streams transmitted simultaneously by the AP 14 to multiple client stations 25 via multiple spatial streams using techniques described in U.S. patent application Ser. No. 12/175,526.

As another example, in another embodiment, the network interface 27, additionally or alternatively, is configured to transmit a data stream to the AP 14 among a plurality of independent data streams transmitted simultaneously by multiple client stations 25 via different spatial streams using techniques described in U.S. patent application Ser. No. 12/175,501.

Before triggering the uplink simultaneously transmission from a group stations, the AP defines the uplink group and notifies the stations in the uplink group about the uplink group allocation, in some embodiments. In an embodiment, the STA sends a communication frame or a management frame that indicates one or more traffic characteristics (e.g., a proposed service interval to be used for an uplink MU-MIMO transmission schedule, a proposed access category data rate to be used for the uplink MU-MIMO transmission schedule, or traffic burst information to be used for the uplink MU-MIMO transmission schedule) to the AP through an enhanced distributed channel access (EDCA) procedure. The AP performs selection of the members of the client uplink group based on the uplink traffic characteristic of the stations or other information, for example, the interference among stations. After finishing the member selection of the uplink group, the AP transmits an uplink group definition frame, through EDCA procedures or other medium access mechanisms, to the members of the uplink group. In an embodiment, the uplink group definition frame includes at least one of i) the member stations in the uplink group, ii) a start time of the uplink MU-MIMO transmission schedule, iii) a duration of the uplink MU-MIMO transmission schedule, or iv) an interval between transmissions of the uplink MU-MIMO transmission schedule. In an embodiment, the start time is indicated as a time offset from a transmission time of the uplink group definition frame until a transmission time of a communication frame to trigger uplink simultaneous transmission, described below, or another suitable time indication. In an embodiment, the duration is indicated as a time duration (e.g., a TXOP for uplink simultaneous transmission), a number of data frames to be transmitted during the schedule. In an embodiment, the interval indicates a time duration (e.g., a number of microseconds) between two adjacent uplink simultaneous transmission TXOPs, an integer number of predetermined intervals (e.g., an integer multiple of a short interframe spacing), or other suitable interval indication. In an embodiment, the AP sets the interval to the proposed service interval received from a client station. In an embodiment, the uplink group definition frame indicates a value for an access category, traffic category, traffic stream, TID, data rate, MCS value, or other suitable parameters to be used for transmissions during the uplink MU-MIMO schedule. In an embodiment, the uplink group definition frame is an action frame having one or more information elements that contain the member station identifiers of the uplink group, MU-MIMO transmission schedule and/or other suitable data.

Figure 2:
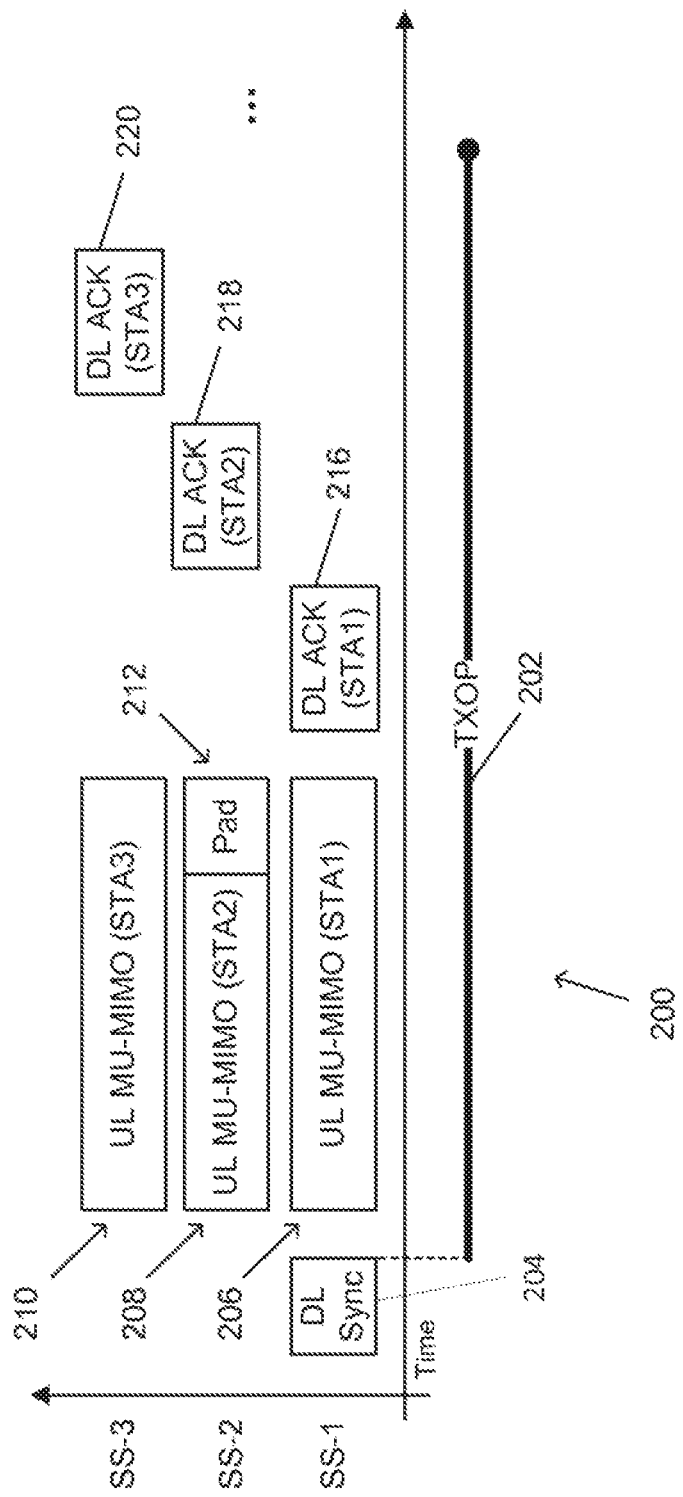
FIG. 2 is a diagram of an example transmission sequence in a WLAN, according to an embodiment.

FIG. 2 is a diagram of an example transmission sequence 200 in a WLAN, such as the WLAN 10 of FIG. 1, according to an embodiment, in which an AP prompts a first client station (STA1), a second client station (STA2), and a third client station (STA3) to transmit independent data simultaneously to the AP during a transmission opportunity (TXOP) 202 of the AP. The AP generates and transmits a communication frame 204 that prompts STA1, STA2, and STA3 to transmit independent data simultaneously to the AP during the TXOP 202 of the AP. In one embodiment, the AP generates and transmits a communication frame 204 that prompts STA1, STA2, and STA3 to transmit independent data simultaneously to the AP via different spatial streams, for example, spatial streams SS-1, SS-2, and SS-3, respectively. In one embodiment, the AP generates and transmits a DL Sync frame 204 to prompt STA1, STA2, and STA3 to transmit independent data simultaneously to the AP via different spatial streams. In another embodiment, a DL Sync frame triggers a group of stations to transmit independent data simultaneously to the AP via different OFDM subchannels.

In one embodiment, the communication frame 204 includes a duration field (e.g., an UL physical layer protocol data unit (PPDU) duration field) that indicates a maximum duration of UL communication frames (e.g., PPDUs) responsive to the communication frame 204. In one embodiment, the communication frame 204 comprises a PHY preamble and omits a MAC portion. In this embodiment, the PHY preamble includes a group ID corresponding to a client uplink group and a duration field that indicates a maximum duration of UL communication frames (e.g., PPDUs) responsive to the communication frame 204. In an embodiment, the communication frame 204 includes station identifiers that indicate which client stations should transmit during the TXOP 202. In an embodiment, the communication frame 204 includes a number of spatial streams ($N_{ss}$) and an index for the corresponding spatial streams to be used by the corresponding client stations. In an embodiment, the communication frame 204 includes a channel bandwidth to be used by the corresponding client stations. In an embodiment, the communication frame includes a modulation and coding scheme (MCS) value that corresponds to a modulation and coding scheme to be used by the corresponding client station. In an embodiment, the communication frame includes a transmission power value to be used by the corresponding client station.

Responsive to the communication frame 204, STA1, STA2, and STA3 transmit independent data simultaneously to the AP during the TXOP 202 of the AP. For example, in an embodiment, STA1 transmits a communication frame 206, STA2 simultaneously transmits a communication frame 208, and STA3 simultaneously transmits a communication frame 210. In one embodiment, the communication frame 206, the communication frame 208, and the communication frame 210 are transmitted using different spatial streams, for example, spatial streams SS-1, SS-2, and SS-3, respectively. In an embodiment, a duration of the communication frame 206, a duration of the communication frame 208, and/or a duration of the communication frame 210 are less than or equal to the maximum duration indicated in the communication frame 204. Thus, in an embodiment, STA1, STA2, and STA3 generate the communication frame 206, the communication frame 208, and the communication frame 210 to have a duration less than or equal to the maximum duration indicated in the communication frame 204. In one embodiment, if the communication frame 208 is less than the maximum duration indicated in the communication frame 204, STA2 includes padding 212 to increase the total duration to the maximum duration. In another embodiment, the padding 212 is omitted. In one embodiment, each of communication frames 206, 208, and 210 are padded to the maximum duration if they are shorter than the maximum duration.

The AP generates and transmits acknowledgments (ACKs or BlockAcks) 216, 218, and 220 to STA1, STA2, and STA3, respectively, to acknowledge the communication frames 206, 208, and 210. In the embodiment shown in FIG. 2, the AP transmits each of ACK 216, ACK 218, and ACK 220 at different times (i.e., staggered times) and in different spatial streams. In an embodiment, the spatial stream in which the ACK is transmitted is the same spatial stream in which the corresponding communication frame is transmitted (i.e., communication frame 206 and ACK 216 are transmitted using spatial stream SS-1). In another embodiment, the AP transmits each of ACK 216, ACK 218, and ACK 220 at different times in a same spatial stream. The AP, in some embodiments, continues generating and transmitting communication frames that prompt STA1, STA2, and/or STA3 to transmit additional independent data simultaneously to the AP during the remainder of the TXOP 202 of the AP. In one embodiment, STA1, STA2, and STA3 include updated pending data queue information in the communication frames 206, 208, and 210. In this embodiment, the AP utilizes the updated pending data queue information to determine a maximum duration for the additional independent data, and the AP includes information indicating the maximum duration in an additional DL Sync frame (not shown).

Figure 3:
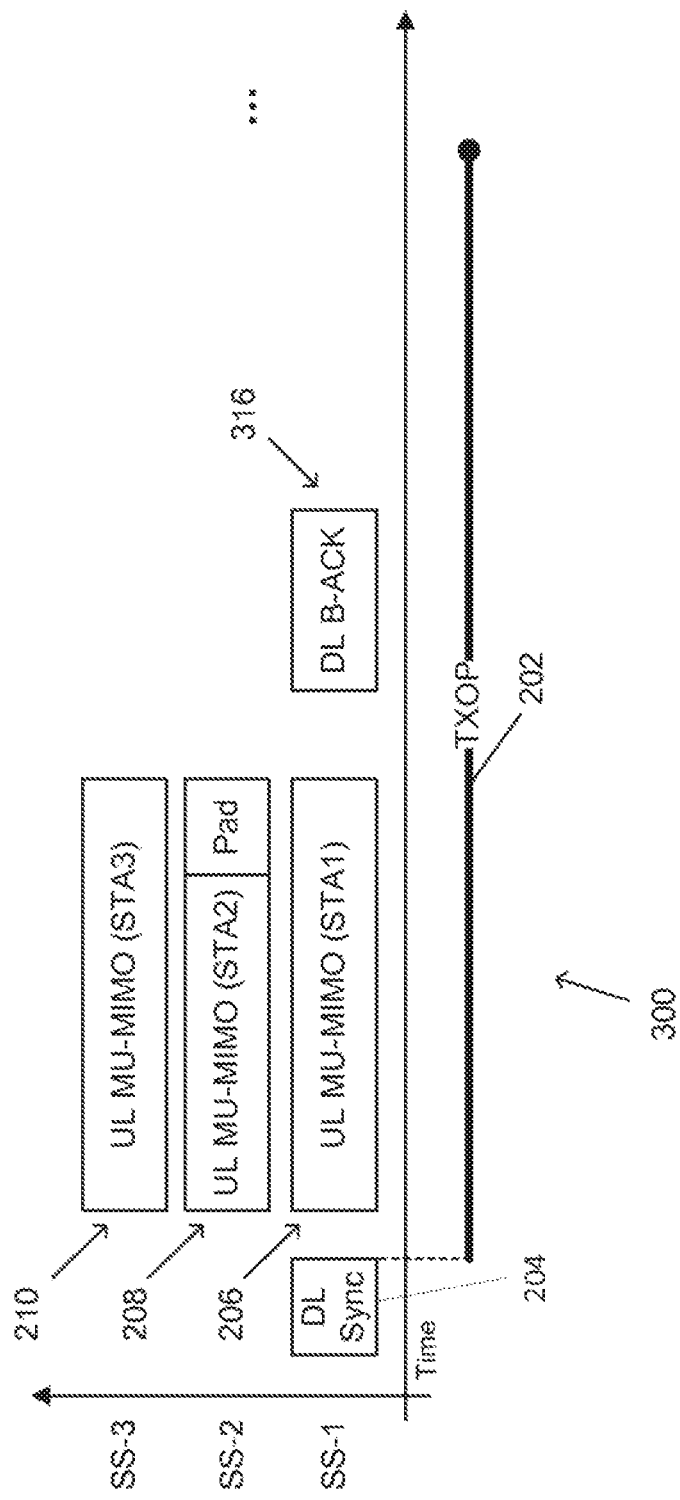
FIG. 3 is a diagram of another example transmission sequence in a WLAN, according to another embodiment.

FIG. 3 is a diagram of another example transmission sequence 300 in a WLAN, such as the WLAN 10 of FIG. 1, according to an embodiment, in which an AP prompts a first client station (STA1), a second client station (STA2), and a third client station (STA3) to transmit independent data simultaneously to the AP during a transmission opportunity (TXOP) 302 of the AP. The transmission sequence 300 is generally the same as the transmission sequence 200, however the AP utilizes a broadcast acknowledgment (B-ACK) 316 instead of the separate acknowledgments 216, 218, and 220. In an embodiment, the B-ACK 316 is a control frame that includes the group ID of the client uplink group (e.g., as a receiver address), station identifiers (e.g., AIDs) from which the communication frames 206, 208, and 210 were transmitted, and/or other suitable acknowledgment information which acknowledges the transmissions from STA1, STA2, and STA3. In an embodiment, the B-ACK includes both ACK and BlockAck to acknowledge the transmissions from multiple STAs. In an embodiment, the AP transmits the B-ACK 316 in a single spatial stream. In another embodiment, the AP transmits the B-ACK 316 as multiple beamforming spatial streams. In one such embodiment, the B-ACK 316 is transmitted as separate downlink MU-MIMO data units for each client station using the spatial streams in which each of the communication frames 206, 208, and 210 were transmitted (i.e., spatial streams, SS-1, SS-2, and SS-3, respectively). In another such embodiment, the B-ACK 316 is combined with other data, such as an aggregate media access control protocol data unit (A-MPDU), transmitted to the client stations. In another embodiment, the B-ACK is used to acknowledge the simultaneous transmission in different OFDM subchannels.

Figure 4:
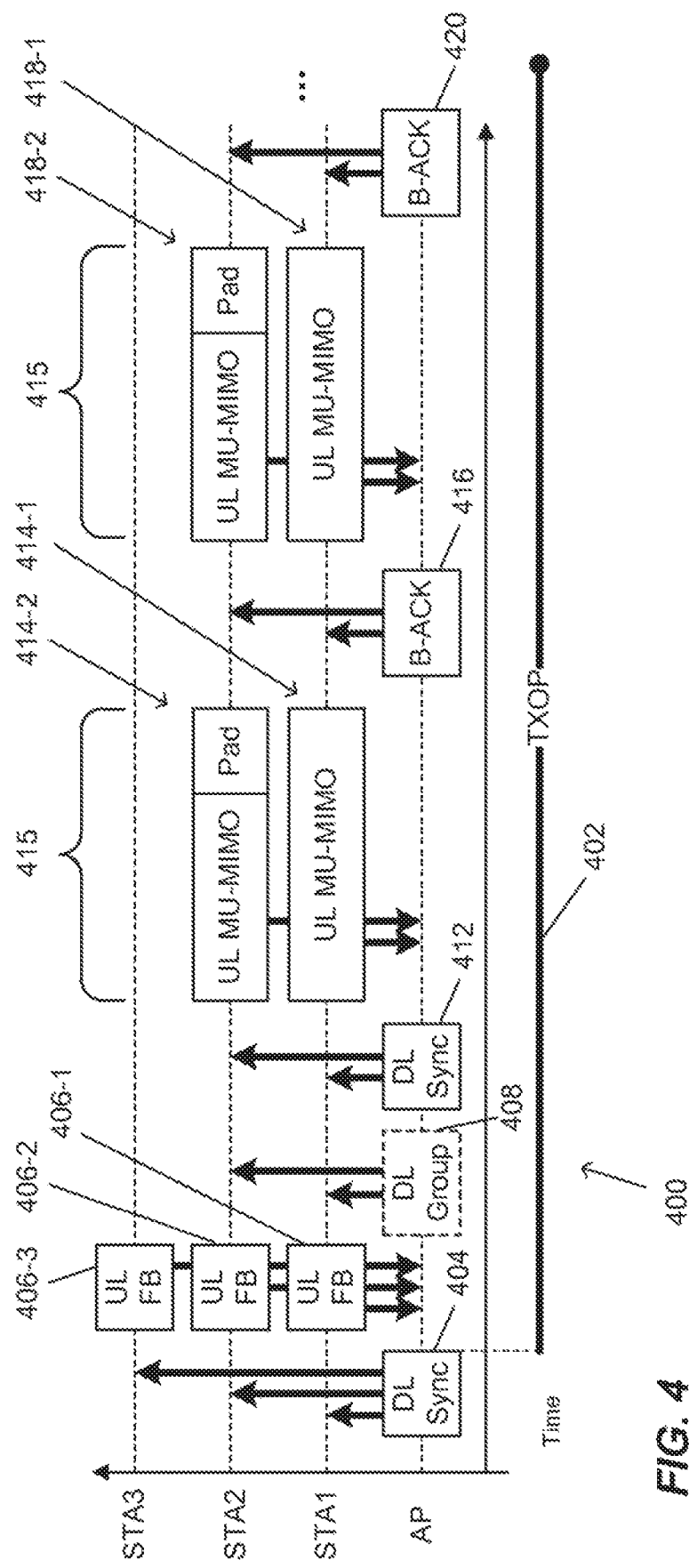
FIG. 4 is a diagram of an example transmission sequence in a WLAN that is initiated by an access point, according to an embodiment.

FIG. 4 is a diagram of an example transmission sequence 400 in a WLAN, such as the WLAN 10 of FIG. 1, according to an embodiment, in which the transmission sequence 400 is initiated by an access point. In a TXOP 402 of the AP, the AP generates and transmits a trigger signal, such as a polling communication frame 404, to a plurality of client stations, such as client stations STA1, STA2, and STA3. In an embodiment, the polling communication frame 404 is a downlink sync frame (DL Sync). In another embodiment, the polling communication frame 404 is an action frame designated as a polling frame. In an embodiment, the AP sets a value of a duration field of the communication frame 404 to a value corresponding to a remaining duration of the TXOP 402 of the AP, for example, to protect subsequent transmissions in the TXOP 402.

In an embodiment, the AP transmits the polling communication frame 404 in a single spatial stream. In one such embodiment, the polling communication frame 404 has a receiving address that corresponds to a group ID of a client uplink group. In this embodiment, client stations that are members of the client uplink group are configured to respond to the polling communication frame 404 based on the group identifier. In another embodiment, the AP transmits the polling communication frame 404 to each client station communicatively coupled and/or registered with the AP. In an embodiment, the AP previously communicates to the client stations which client stations are in the client uplink group corresponding to the group ID. For example, in one embodiment, the AP previously transmits an uplink group definition frame 408, described below, that indicates a group ID and also includes a plurality of association IDs (AIDs) that identify client stations that belong to the group corresponding to the group ID. Subsequently, when the AP transmits the polling communication frame 404 with the group ID, the client stations belonging to the group ID recognize that they are being requested to transmit information indicating whether they have data that is to be transmitted to the AP (e.g., traffic information). In this embodiment, the order of AIDs in the group definition frame indicates a spatial stream with which the client stations belonging to the group ID are to transmit feedback frames, as described below.

In another embodiment, the polling communication frame 404 includes the group ID and the plurality of AIDs that identify client stations that belong to the client uplink group corresponding to the group ID. In an embodiment, the order of AIDs in the group definition frame indicates a spatial stream with which the client stations belonging to the group ID are to transmit feedback frames. In one embodiment, the polling communication frame 404 is a group definition frame with an indicator (e.g., a field, a flag, etc., in a PHY header or a MAC header) that indicates that client stations in the group corresponding to the group ID should transmit to the AP information regarding whether the client stations have data that is to be transmitted to the AP.

In one embodiment in which the polling communication frame 404 includes the group ID, the polling communication frame 404 also includes information (e.g., a bitmap, with each bit corresponding to a client station in the client uplink group) that indicates which stations in the group corresponding to the group ID are to transmit information indicating whether the client station has data that is to be transmitted to the AP. For example, in an embodiment, a polling communication frame 404 includes a group ID and information indicating a subset of client stations in the group that are to transmit information indicating whether there is data that is to be transmitted to the AP.

In an embodiment, the polling communication frame 404 includes information that prompts a client station to transmit an uplink traffic characteristic information signal. In an embodiment, the polling communication frame 404 prompts the client station to transmit a proposed service interval to be used for an uplink MU-MIMO transmission schedule, a proposed access category (AC) data rate to be used for the uplink MU-MIMO transmission schedule, or traffic burst information to be used for the uplink MU-MIMO transmission schedule. In an embodiment, the polling communication frame 404 includes a request for the client station to transmit the information indicating whether the client station has data that is to be transmitted to the AP. In an embodiment, the information indicating whether the client station has data that is to be transmitted to the AP is an indication of an amount of data in a queue corresponding to data that is to be transmitted to the AP. In an embodiment, the queue corresponds to a particular traffic category. In an embodiment, the queue corresponds to a particular traffic stream. In an embodiment, the queue corresponds to a particular traffic identifier (TID) such as the TID described in the IEEE 802.11e Standard. In an embodiment, the polling communication frame 404 prompts the client station to transmit information indicating an amount of data in a particular traffic category, traffic stream, or traffic identifier (TID) that is to be transmitted to the AP. In an embodiment, the polling communication frame 404 prompts the client station to transmit information indicating an amount of data in one or more or all traffic categories, traffic streams, or TIDs that are to be transmitted to the AP.

In response to the polling communication frame 404, each client station simultaneously transmits a respective communication frame 406 (i.e., communication frames 406-1, 406-2, and 406-6) to the AP during the TXOP 402 of the AP, where the communication frame 406 (referred to herein as an uplink feedback frame or FB frame) includes information indicating whether the client station has data to be transmitted to the AP. In an embodiment, the information includes the uplink traffic characteristic information signal, as described above. In an embodiment, the indication of the amount of data in the queue is field in a MAC header of the FB frame 406. In an embodiment, the indication of the amount of data in the queue is subfield in a QoS field of the MAC header. In an embodiment, each FB frame 406 indicates an amount of data in the particular traffic category (or categories), traffic stream(s), or TID(s) indicated by the polling frame 404. In some embodiments, the FB frame is an action frame having an information element that contains the uplink traffic characteristic information signal. In an embodiment, the client station combines the feedback frame 406 with an aggregate media access control protocol data unit in an uplink MU-MIMO data unit.

In an embodiment, the AP receives the FB frames 406 that include the information about the station's uplink characteristic information that is to be transmitted to the AP, and uses this information to determine the uplink group allocation. In the scenario illustrated in FIG. 4, the AP determines that multiple client stations have the same or similar traffic characteristic. As a result, the AP selects multiple communication devices as members of a client uplink group based at least on the information indicated by the respective uplink traffic characteristic information signals. In an embodiment, the AP performs selection of the members of the client uplink group and transmits an uplink group definition frame 408 before transmitting the communication frame 404. In some embodiments, the AP maintains the client uplink group for a period of time, such as until the end of the uplink MU-MIMO schedule, for a predetermined time (e.g., 5 seconds, 2 minutes), or another suitable duration. In an embodiment, the AP maintains the client uplink group until one or more members, or all members, of the client uplink group is dissociated with the AP.

In an embodiment, the AP generates and transmits the uplink group definition frame 408 to each member of the client uplink group. In an embodiment, the uplink group definition frame 408 also indicates an uplink multi-user multiple input multiple output (MU-MIMO) transmission schedule for the client uplink group for members of the client uplink group to simultaneously transmit to an access point. In an embodiment, the uplink group definition frame 408 includes at least one of i) the member stations in the uplink group, ii) a start time of the uplink MU-MIMO transmission schedule, iii) a duration of the uplink MU-MIMO transmission schedule, or iv) an interval between transmissions of the uplink MU-MIMO transmission schedule. In an embodiment, the start time is indicated as a time offset from a transmission time of the uplink group definition frame 408 until a transmission time of a communication frame 412, described below, or another suitable time indication. In an embodiment, the duration is indicated as a time duration (e.g., a remainder of the TXOP 402), a number of data frames to be transmitted during the schedule, or other suitable indicators. In an embodiment, the interval between transmissions indicates a time duration (e.g., a number of microseconds), an integer number of predetermined intervals (e.g., an integer multiple of a short interframe spacing), or other suitable interval indication. In an embodiment, the AP sets the interval to the proposed service interval received from a client station (e.g., from communication frame 406). In an embodiment, the uplink group definition frame 408 indicates a value for an access category, traffic category, traffic stream, TID, data rate, MCS value, or other suitable parameters to be used for transmissions during the uplink MU-MIMO schedule. In an embodiment, the uplink group definition frame is an action frame having one or more information elements that contain the MU-MIMO transmission schedule and/or other suitable data.

In one embodiment, the AP receives the FB frames 406 that include the information indicating whether the client stations in a client uplink group have data that is to be transmitted to the AP, and uses this information to determine whether the client stations have data that is to be transmitted to the AP. In the scenario illustrated in FIG. 4, the AP determines that multiple client stations from a client uplink group have data that is to be transmitted to the AP. As a result, the AP selects multiple communication devices from a client uplink group for uplink data frame transmission. The AP generates and transmits a communication frame 412 that prompts the selected multiple client stations to transmit independent data simultaneously to the AP during the TXOP 402 of the AP. In some embodiments, the communication frame 412 is generally the same as the communication frame 204. In one embodiment, the AP generates and transmits the communication frame 412 to prompt the multiple client stations to transmit independent data simultaneously to the AP via different spatial streams, for example, independent uplink MU-MIMO data units. In one embodiment, the AP generates and transmits a DL Sync frame 412 to prompt the multiple client stations to transmit independent data simultaneously to the AP via different spatial streams. In an embodiment, the DL Sync frame 412 includes an indication of a data unit size 415 to be used for the independent uplink MU-MIMO data units, for example, an indication of a time duration or bit count. In an embodiment, the AP transmits the communication frame 412 according to the UL MU-MIMO transmission schedule. In some embodiments, the communication frame 412 is provided as a legacy PPDU, such as an IEEE 802.11a/b/g (duplicate) PPDU. In an embodiment, the AP sets a value of a duration field of the communication frame 412 to a value corresponding to a remaining duration of the TXOP 402 of the AP, for example, to protect subsequent transmissions in the TXOP 402.

In response to the communication frame 412, the multiple client stations transmit independent data units 414 simultaneously to the AP during the TXOP 402 of the AP in one or more transmissions. For example, in an embodiment, the multiple client stations generate and transmit one or more UL MU-MIMO data units 414 via different spatial streams. In the embodiment shown in FIG. 4, the STA1 transmits an UL MU-MIMO data unit 414-1 to the AP simultaneously with a transmission by the STA2 of an UL MU-MIMO data unit 414-2 to the AP. In an embodiment, the UL MU-MIMO data units 414 correspond to a particular traffic category, traffic stream, or TID indicated by the communication frame 412. In an embodiment, the UL MU-MIMO data units 414 at least include the traffic category, traffic stream, or TID associated with the TXOP or indicated by the communication frame 412. In an embodiment, one or more of the UL MU-MIMO data units 414 includes suitable padding to have a suitable data unit size (e.g., the data unit size 415).

In response to receipt of the UL MU-MIMO data units 414, the AP transmits a broadcast acknowledgment (B-ACK) 416 to acknowledge the uplink MU-MIMO data units 414, as described above with respect to B-ACK 316. In some embodiments, the client stations transmit one or more additional UL MU-MIMO data units 418 during a remainder of the TXOP 402 in response to the B-ACK 416, for example, according to the previous DL SYNC frame which defines multiple UL MU-MIMO transmissions. In an embodiment, the AP transmits an additional communication frame, such as an additional DL Sync frame 412 to prompt the multiple client stations to transmit the additional UL MU-MIMO data units 418. In an embodiment, the AP transmits a combined frame that includes the B-ACK 416 and the additional DL Sync frame 412. In response to receipt of the UL MU-MIMO data units 418, the AP transmits a broadcast acknowledgment (B-ACK) 420 to acknowledge the uplink MU-MIMO data units 418, as described above. In an embodiment, the B-ACK 416 is omitted and the B-ACK 420 acknowledges the UL MU-MIMO data units 414 and the UL MU-MIMO data units 418.

In an embodiment, when a transmission time of downlink PPDU(s) between adjacent UL MU PPDUs (i.e., between UL MU-MIMO data units 414 and 418) is smaller than an extended interframe space, at least some neighbor devices of the AP (e.g., other access points or client stations) use a value of a duration subfield in the communication frame 404 or the communication frame 412 to set a network allocation vector (NAV). In one such embodiment, neighbor devices of the client stations use the extended interframe space to protect the TXOP 402. In another embodiment, when the transmission time of downlink PPDU(s) between adjacent UL MU PPDUs is longer than the extended interframe space, additional request to send and/or clear to send messages are used for protection of the TXOP 402, as described below with respect to FIG. 5 and FIG. 7.

In one embodiment, when the multiple client stations transmit independent data simultaneously to the AP during the TXOP 402 of the AP in one or more data units 414, the client stations disregard a network allocation vector (NAV) in the communication frame 404 or communication frame 412 because the multiple client stations are scheduled by the communication frame 402 or communication frame 412. When the client stations disregard the NAV, the client stations can transmit communication frames 414 during the TXOP of the AP. In another embodiment, the communication frame 412 includes a reverse direction grant (RDG) indicator that indicates that the client stations are permitted to transmit communication frames 414 during the TXOP 402 of the AP.

Figure 5:
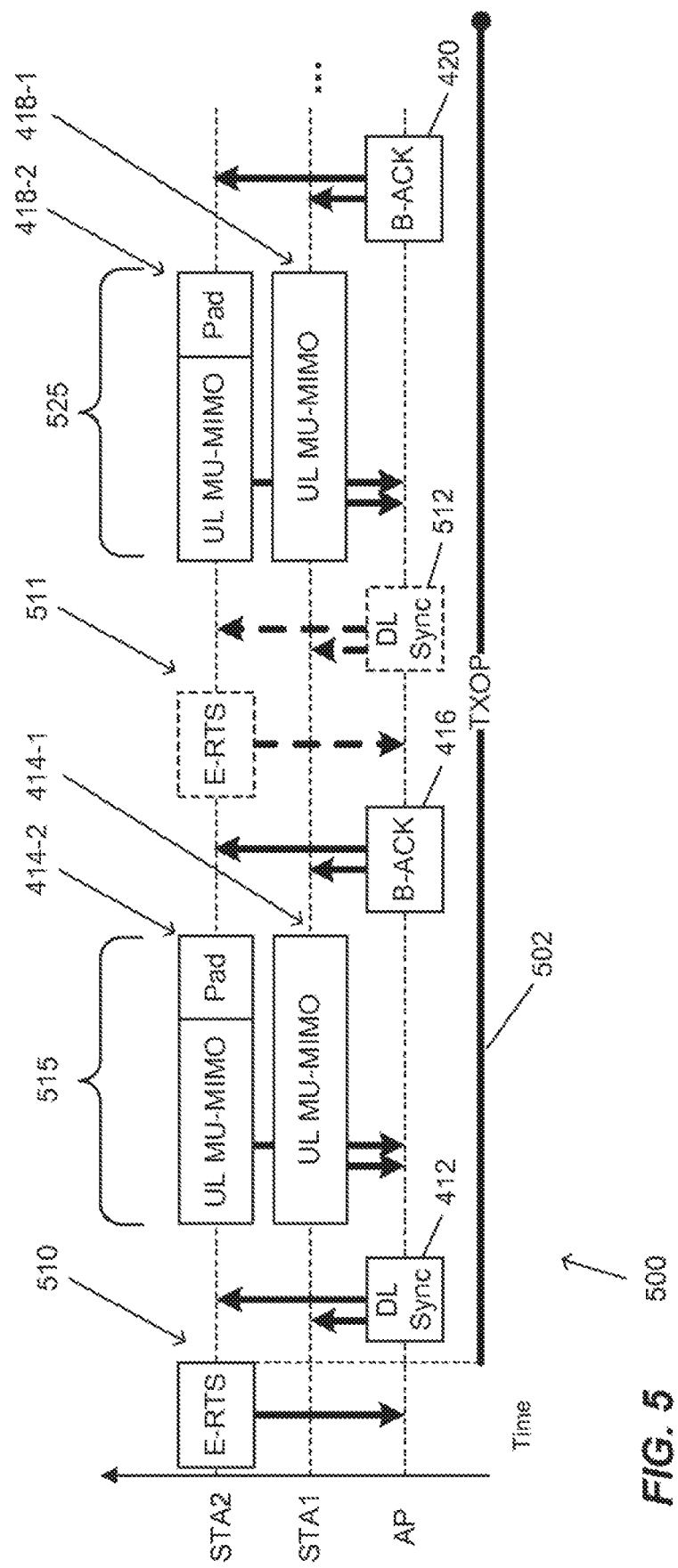
FIG. 5 is a diagram of an example transmission sequence in a WLAN that is initiated by a communication device, according to another embodiment.

FIG. 5 is a diagram of an example transmission sequence 500 in a WLAN, such as the WLAN 10 of FIG. 1, according to an embodiment, in which the transmission sequence 500 is initiated by a communication device. The transmission sequence 500 is generally the same as the transmission sequence 400, however, a client station, such as the STA2, transmits a trigger frame, e.g. enhanced request to send (E-RTS) message 510 to the AP. In some embodiments, the enhanced RTS message 510 indicates that the STA2 has a TXOP 502 (instead of the TXOP 402 of the AP of FIG. 4) and data to be transmitted to the AP (e.g., in an UL MU-MIMO data unit). In an embodiment, the E-RTS message 510 includes i) a length of the TXOP 502 of the STA2 and ii) an indication of a data unit size 515 for an uplink MU-MIMO data unit to be transmitted by the STA2. In an embodiment, the STA2 is a member of a client uplink group and the indication of the data size unit is a data unit size for an uplink MU-MIMO data unit to be transmitted by the STA2 simultaneously with transmissions of other members of the client uplink group. In an embodiment, the E-RTS message 510 includes an indication of whether the data unit size 515 should be used until the end of the TXOP 502. In an embodiment, the client station sets a value of a duration field of the E-RTS message 510 to a value corresponding to a duration of the TXOP 502, for example, to protect subsequent transmissions in the TXOP 502. In an embodiment, the STA2 sends the E-RTS 510 after waiting for a duration of an arbitration interframe spacing (AIFS) and a backoff value. In some embodiments, the E-RTS 510 is provided as a legacy PPDU, such as an IEEE 802.11a/b/g (duplicate) PPDU.

In response to the E-RTS message 510, the AP transmits the communication frame 412, as described above with respect to FIG. 4. In some embodiments, the AP transmits the communication frame 412 after a short interframe space after the E-RTS message 510. In an embodiment, the communication frame 412 includes the indication of the data unit size 515 from the E-RTS message 510. In one such embodiment, the UL MU-MIMO data units 414 have a size corresponding to the data unit size 515. In response to receipt of the UL MU-MIMO data units 414, the AP transmits the broadcast acknowledgment (B-ACK) 416 to acknowledge the uplink MU-MIMO data units 414, as described above. In some embodiments, the client stations transmit one or more additional UL MU-MIMO data units 418 during a remainder of the TXOP 502 in response to the B-ACK 416, for example, according to the uplink MU-MIMO transmission schedule indicated by the previous communication frame 412. In an embodiment, the client station STA2 transmits an additional E-RTS message 511 to indicate that the STA2 has remaining time in the TXOP 502 and additional data to be transmitted to the AP. In an embodiment, the E-RTS message 511 includes an additional data unit size 525 for the additional uplink MU-MIMO data unit to be transmitted by the STA2. In some embodiments, the client station uses the frame exchange E-RTS and SYNC for dynamic bandwidth negotiations with the AP.

In response to the E-RTS message 511, the AP transmits an additional communication frame 512, such as an additional DL sync frame 512, to prompt the multiple client stations to transmit the additional UL MU-MIMO data units 418, in an embodiment. In another embodiment, the AP transmits a combined frame that includes the B-ACK 416 and the additional DL sync frame 512. In an embodiment, the STA transmits a combined frame that includes the UL MU-MIMO data unit 414-2 and the E-RTS message 511. In another embodiment, the E-RTS message 511 and communication frame 512 are omitted and the client stations transmit the UL MU-MIMO data units 418 in response to the B-ACK 416.

Figure 6:
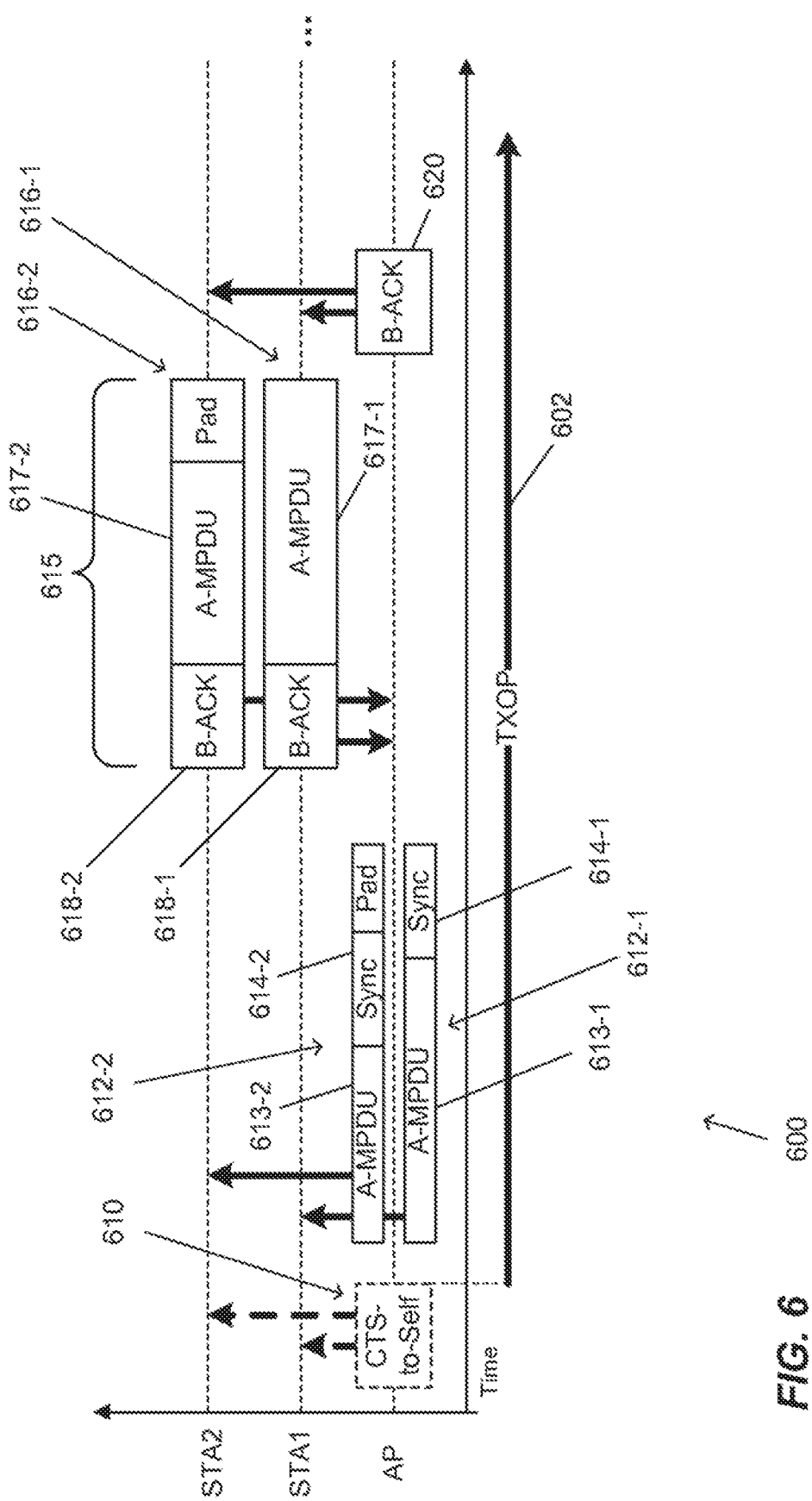
FIG. 6 is a diagram of an example transmission sequence in a WLAN that is initiated by an access point, according to an embodiment.

FIG. 6 is a diagram of an example transmission sequence 600 in a WLAN, such as the WLAN 10 of FIG. 1, according to an embodiment, in which the transmission sequence 600 is initiated by an access point. In the embodiment of FIG. 6, the AP transmits a communication frame 610 that indicates a length of a TXOP 602 of the access point, for example, to protect subsequent transmissions in the TXOP 602 (e.g., to reserve time for a transmission to client station STA1 and client station STA2 of the client uplink group). In an embodiment, the communication frame 610 is a clear to send to self (CTS-to-Self) frame 610. The AP simultaneously transmits respective downlink MU-MIMO data units 612 to the STA1 and the STA2. In the embodiment shown in FIG. 6, each downlink MU-MIMO data unit 612 includes i) a respective aggregate media access control protocol data unit (A-MPDU) 613, and ii) a communication signal 614 to prompt transmission of an independent uplink MU-MIMO data unit by the corresponding client station. For example, in an embodiment, the downlink MU-MIMO data unit 612-1 for the STA1 includes the A-MPDU 613-1 and a sync frame 614-1, where the sync frame 614-1 prompts the client station STA1 to transmit an independent uplink MU-MIMO data unit to the AP during the TXOP 602 of the AP (e.g., similarly to the DL sync frame 412). In an embodiment, the sync frame 614 includes an indication of a data unit size 615 for an uplink MU-MIMO data unit to be transmitted by the corresponding client station.

In response to the respective downlink MU-MIMO data units 612, the STA1 and STA2 simultaneously transmit, and the AP simultaneously receives, respective uplink MU-MIMO data units 616. Each uplink MU-MIMO data unit 616 includes i) a respective second A-MPDU 617, and ii) an acknowledgment 618 of the corresponding first A-MPDU 613. In response to receipt of the UL MU-MIMO data units 616, the AP transmits a broadcast acknowledgment (B-ACK) 620 to acknowledge the uplink MU-MIMO data units 616, as described above with respect to B-ACK 420.

Figure 7:
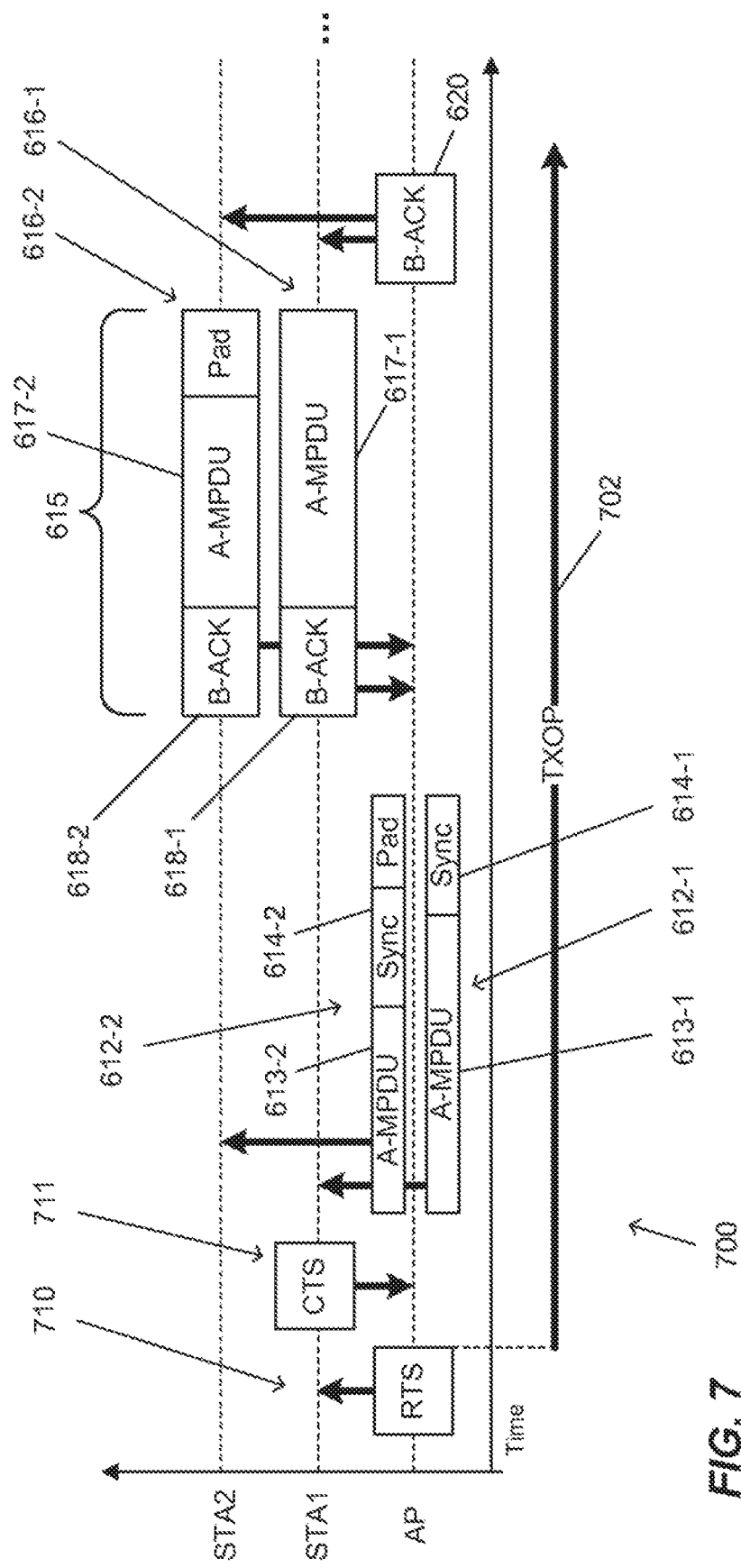
FIG. 7 is a diagram of another example transmission sequence in a WLAN that is initiated by an access point, according to an embodiment.

FIG. 7 is a diagram of another example transmission sequence 700 in a WLAN, such as the WLAN 10 of FIG. 1, according to an embodiment, in which the transmission sequence 700 is initiated by an access point. The transmission sequence 700 is generally the same as the transmission sequence 600, however the AP utilizes a communication frame 710 to indicate a length of a TXOP 702 of the AP, for example, to reserve time for a transmission to client station STA1 and client station STA2 of the client uplink group. In an embodiment, the communication frame 710 is a request to send (RTS) frame 710 that is transmitted to the STA1. In response to the communication frame 710, the STA transmits a communication frame 711 to the AP to confirm receipt of the RTS frame 710. In an embodiment, the communication frame 711 is a clear to send (CTS) frame 711. The AP simultaneously transmits the DL MU-MIMO data units 612 in response to the CTS frame 711, in an embodiment.

Figure 8:
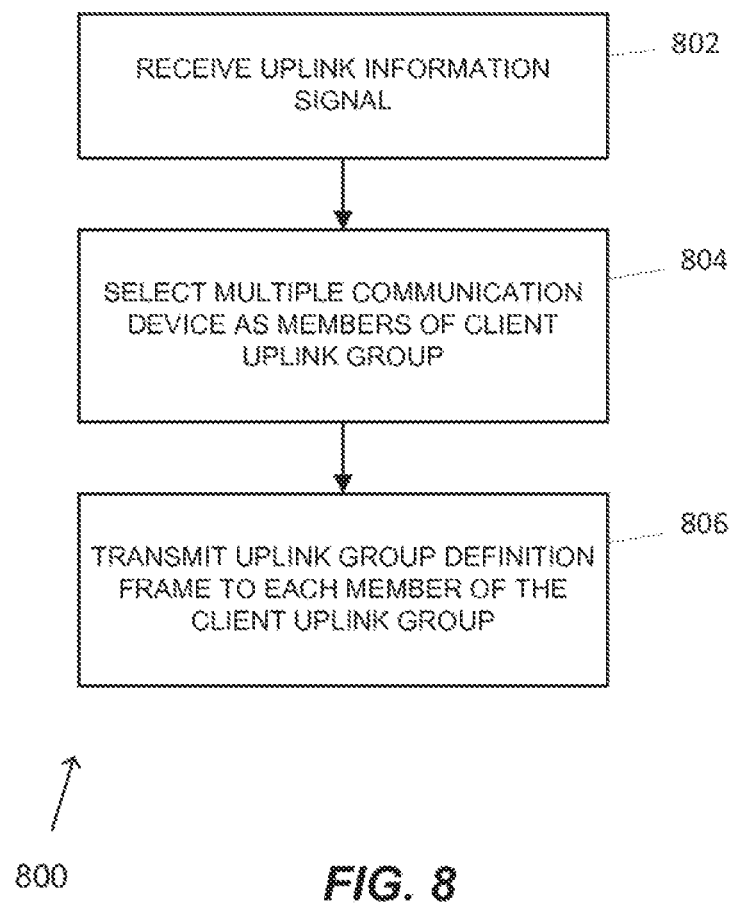
FIG. 8 is a flow diagram of an example method for communication with a client uplink group initiated by an access point, according to an embodiment.

FIG. 8 is a flow diagram of an example method 800 for communication with a client uplink group initiated by an access point of a WLAN, such as the WLAN 10 of FIG. 1, according to an embodiment. The method 800 is implemented by a network interface such as the network interface 16 of the AP 14 of FIG. 1, in an embodiment. For example, the network interface 16 is configured to implement the method 800. In other embodiments, the method 800 is implemented by another suitable communication device.

At block 802, the AP receives an uplink traffic characteristic information signal from each of a plurality of communication devices, in an embodiment. In an embodiment, the uplink traffic characteristic information signal is a management frame and a STA transmits the uplink traffic characteristic information signal using an EDCA procedure. In an embodiment, the uplink traffic characteristic information signal is a feedback frame 406, as described above with respect to FIG. 4. In an embodiment, the uplink traffic characteristic information signal includes at least one of i) a proposed service interval to be used for an uplink MU-MIMO transmission schedule, ii) a proposed access category data rate to be used for the uplink MU-MIMO transmission schedule, or iii) traffic burst information to be used for the uplink MU-MIMO transmission schedule.

At block 804, the AP selects multiple communication devices of the plurality of communication devices as members of a client uplink group based at least on traffic information indicated by the respective uplink traffic characteristic information signal s, in an embodiment, as described above with respect to FIG. 4.

At block 806, the AP transmits an uplink group definition frame to each member of the client uplink group, in an embodiment. In one embodiment, the uplink group definition frame is a management frame that is transmitted by an AP through an EDCA procedure. In some embodiments, the uplink group definition frame is the uplink group definition frame 408, as described with respect to FIG. 4. In an embodiment, the uplink group definition frame indicates the uplink MU-MIMO transmission schedule for the client uplink group for members of the client uplink group to simultaneously transmit to the access point. In an embodiment, the uplink group definition frame includes at least one of i) a start time of the uplink MU-MIMO transmission schedule, ii) a duration of the uplink MU-MIMO transmission schedule, or iii) an interval between transmissions of the uplink MU-MIMO transmission schedule.

In some embodiments, the AP transmits a communication frame to the plurality of communication devices to prompt transmission of the respective uplink traffic characteristic information signals. For example, in an embodiment, the AP transmits a communication frame 404 to the communication devices. In an embodiment, the communication frame includes a poll indication for members of the client uplink group. In an embodiment, the respective uplink traffic characteristic information signals are uplink MU-MIMO feedback frames that include an indication of available uplink data. In an embodiment, the uplink MU-MIMO feedback frames are quality of service null frames. In another embodiment, the uplink MU-MIMO feedback frames are newly defined control frames (i.e., not currently defined in an IEEE 802.11 standard).

In some embodiments, the AP transmits a communication frame to the client uplink group to prompt simultaneous transmission of independent uplink MU-MIMO data units by members of the client uplink group according to the uplink MU-MIMO transmission schedule. In an embodiment, the communication frame is the DL sync frame 412, as described above with respect to FIG. 4. In an embodiment, the communication frame includes an indication of a data unit size to be used for the independent uplink MU-MIMO data units, for example, the data unit size 415. In an embodiment, the communication frame includes an indication of a maximum duration for a transmission period in which both the independent uplink MU-MIMO data units and corresponding downlink acknowledgments are to be transmitted if a maximum duration for a transmission period in which the downlink acknowledgments are to be transmitted is less than an extended interframe space.

In an embodiment, the AP simultaneously receives the independent uplink MU-MIMO data units from the client uplink group. In a further embodiment, the AP transmits a single group acknowledgment frame to the client uplink group. In an embodiment, the single group acknowledgment frame has i) a receiver address corresponding to a group identifier of the client uplink group and ii) a broadcast acknowledgment indicator for each member of the client uplink group, e.g., AID of the client and the indication of the acknowledged frame(s).

In an embodiment, the AP receives an independent uplink MU-MIMO data unit from a member of the client uplink group while simultaneously receiving one or more other independent uplink MU-MIMO data units from one or more other members of the client uplink group. In a further embodiment, the AP transmits a downlink MU-MIMO data unit to the member of the client uplink group. In one such embodiment, the downlink MU-MIMO data unit includes i) an acknowledgment for the uplink MU-MIMO data unit and ii) an aggregate media access control protocol data unit.

Figure 9:
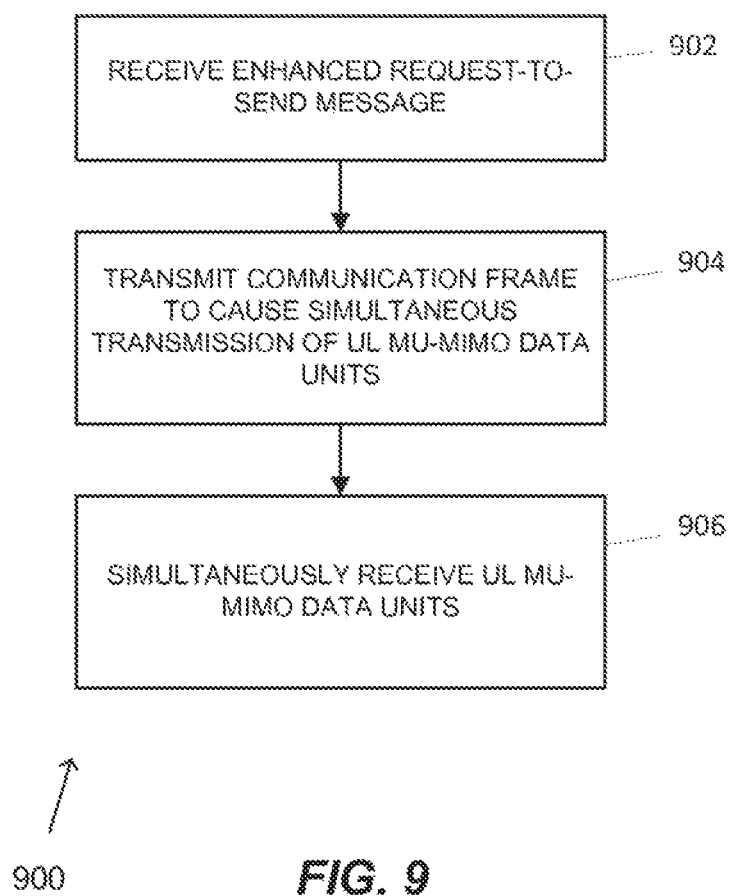
FIG. 9 is a flow diagram of an example method for communication with a client uplink group initiated by a communication device of the client uplink group, according to an embodiment.

FIG. 9 is a flow diagram of an example method 900 for communication with a client uplink group initiated by a communication device of a WLAN, such as the WLAN 10 of FIG. 1, according to an embodiment. The method 900 is implemented by a network interface such as the network interface 27 of the client 25-1 of FIG. 1, in an embodiment. For example, the network interface 27 is configured to implement the method 900. In other embodiments, the method 900 is implemented by another suitable communication device.

At block 902, the AP receives an UL trigger message from a first communication device of a client uplink group, in an embodiment. In an embodiment, UL trigger message is the enhanced RTS message 510. In another embodiment, the UL trigger message is a newly defined control frame. In an embodiment, the enhanced RTS message or the newly defined control frame includes i) a length of a transmission opportunity (TXOP) of the first communication device and ii) an indication of a data unit size for an uplink MU-MIMO data unit to be transmitted by the first communication device.

At block 904, the AP transmits a communication frame to the first communication device and a second communication device of the client uplink group to cause a simultaneous transmission of respective uplink MU-MIMO data units from the first communication device and the second communication device, in an embodiment. In an embodiment, the communication frame is the communication frame 412. In some embodiments, the communication frame includes the indication of the data unit size which was received in the RTS message.

At block 906, the AP simultaneously receives the respective uplink MU-MIMO data units, in an embodiment. The uplink MU-MIMO data units have the indicated data unit size, in an embodiment. In an embodiment, the uplink MU-MIMO data units are the uplink MU-MIMO data units 414 and/or 418.

In some embodiments, the AP transmits a single downlink MU-MIMO data unit to the first communication device and the second communication device. In an embodiment, the single downlink MU-MIMO data unit is the B-ACK 316, 416, or 420. In an embodiment, the downlink MU-MIMO data unit include i) an acknowledgment for the uplink MU-MIMO data unit from first communication device and ii) an acknowledgment for the uplink MU-MIMO data unit from the second communication device.

In an embodiment, the AP selects a data rate for the communication frame 412 and the downlink MU-MIMO data unit 416 based on members of the client uplink group. In one such scenario, the AP selects the data rate to guarantee that other members of the client uplink group are able to decode the communication frame 412 and the downlink MU-MIMO data unit 416. In another embodiment, the AP selects a data rate for the communication frame 412 and the downlink MU-MIMO data unit 416 based on a data rate indication included in the RTS message from the first communication device. In one such scenario, the first communication device can more efficiently use its TXOP.

Figure 10:
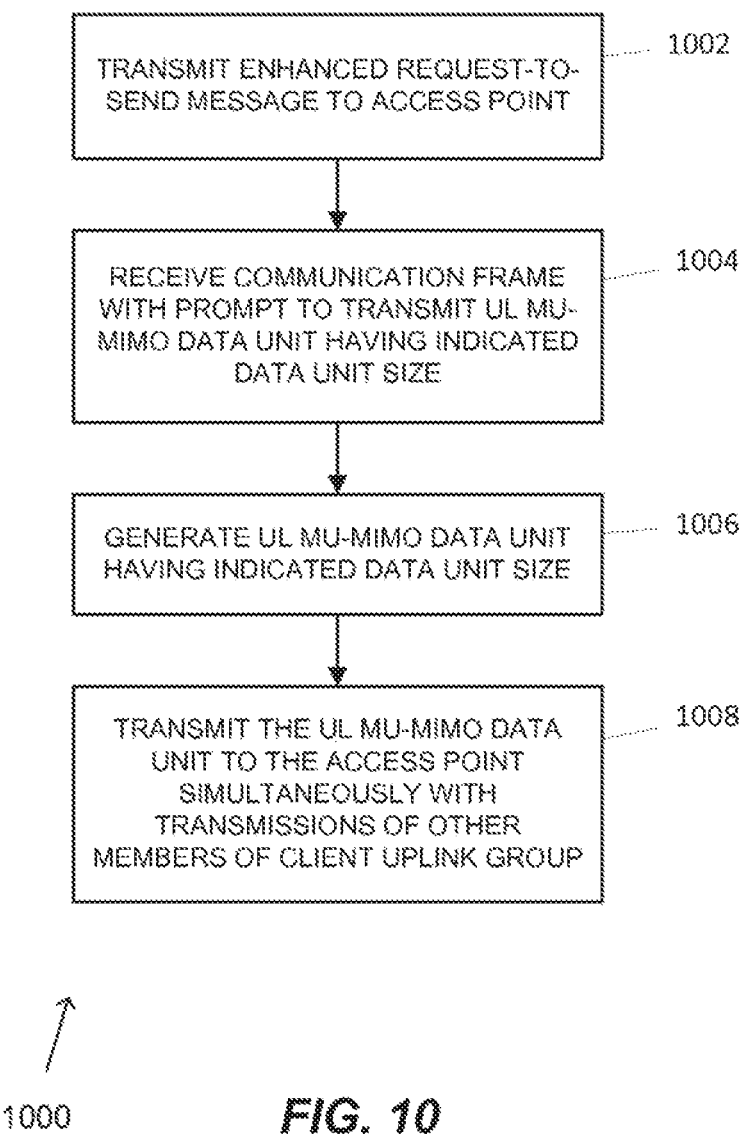
FIG. 10 is a flow diagram of another example method for communication with a client uplink group initiated by a communication device of the client uplink group, according to an embodiment.

FIG. 10 is a flow diagram of an example method 1000 for communication with a client uplink group initiated by a communication device of a WLAN, such as the WLAN 10 of FIG. 1, according to an embodiment. The method 1000 is implemented by a network interface such as the network interface 27 of the client 25-1 of FIG. 1, in an embodiment. For example, the network interface 27 is configured to implement the method 1000. In other embodiments, the method 1000 is implemented by another suitable communication device.

At block 1002, a communication device of a client uplink group transmits an UL trigger message to an access point of a wireless local area network, in an embodiment. In an embodiment, the UL trigger message is the enhanced RTS message 510 or a newly defined control frame. The enhanced RTS message or the newly defined control frame includes i) a length of a transmission opportunity (TXOP) of the communication device and ii) an indication of a data unit size for an uplink MU-MIMO data unit to be transmitted by the communication device simultaneously with transmissions of other members of the client uplink group, in an embodiment.

At block 1004, the communication device receives a communication frame from the access point, in an embodiment. In an embodiment, the communication frame is the communication frame 412. The communication frame includes a prompt to transmit an uplink MU-MIMO data unit having the indicated data unit size, in an embodiment.

At block 1006, the communication device generates the uplink MU-MIMO data unit having the indicated data unit size. In an embodiment, the uplink MU-MIMO data unit is the uplink MU-MIMO data unit 414. At block 1008, in response to the communication frame, the communication device transmits the uplink MU-MIMO data unit to the access point during the TXOP simultaneously with transmissions of other members of the client uplink group.

In an embodiment, the communication devices generates the uplink MU-MIMO data unit to include an additional enhanced RTS message that includes i) a remainder of the TXOP length and ii) an indication of a data unit size for another uplink MU-MIMO data unit to be transmitted by the communication device.

In some embodiments, the communication device receives a group acknowledgment frame from the access point during the TXOP. In an embodiment, the group acknowledgment frame is the B-ACK 316, 416, or 420. The group acknowledgment frame includes respective acknowledgments for i) the uplink MU-MIMO data unit transmitted by the communication device and ii) another uplink MU-MIMO data unit transmitted by another communication device of the client uplink group, in an embodiment. The communication device generates an additional uplink MU-MIMO data unit, for example, the uplink MU-MIMO data unit 418, having the indicated data unit size after receipt of the group acknowledgment frame, in an embodiment. The communication device transmits, in response to the communication frame, the additional uplink MU-MIMO data unit to the access point during the TXOP simultaneously with transmissions of other members of the client uplink group.

Figure 11:
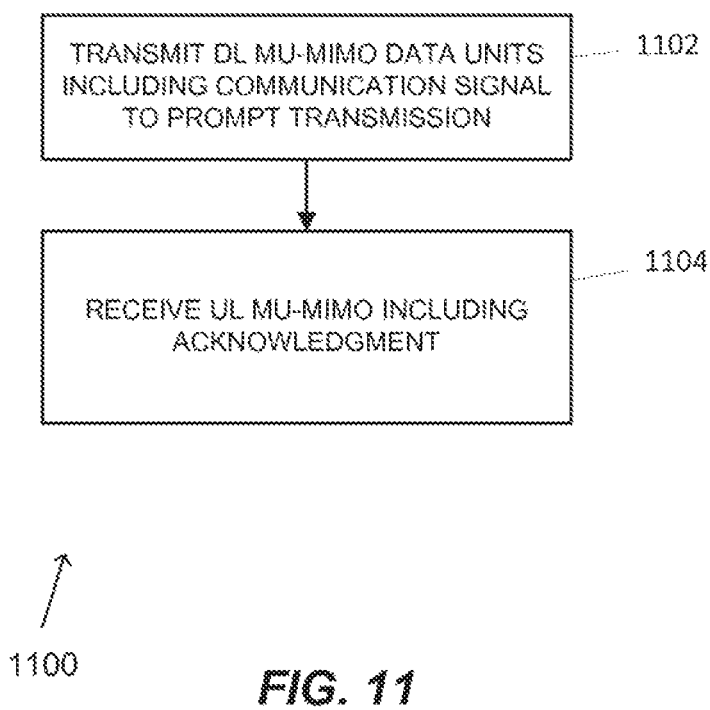
FIG. 11 is a flow diagram of an example method for communication with a client uplink group initiated by an access point, according to an embodiment.

FIG. 11 is a flow diagram of an example method 1100 for communication with a client uplink group initiated by an access point of a WLAN, such as the WLAN 10 of FIG. 1, according to an embodiment. The method 1100 is implemented by a network interface such as the network interface 16 of the AP 14 of FIG. 1, in an embodiment. For example, the network interface 16 is configured to implement the method 1100. In other embodiments, the method 1100 is implemented by another suitable communication device.

At block 1102, the access point transmits respective downlink MU-MIMO data units to a first communication device of a client uplink group and a second communication device of the client uplink group, in an embodiment. In an embodiment, the downlink MU-MIMO data unit is the downlink MU-MIMO data unit 612. Each downlink MU-MIMO data unit includes i) a respective first aggregate media access control protocol data unit, and ii) a communication signal to prompt transmission of an independent uplink MU-MIMO data unit by the corresponding communication device of the client uplink group, in an embodiment. The access point transmits the downlink MU-MIMO data units simultaneously, in various embodiments.

At block 1104, the access point receives, in response to the respective downlink MU-MIMO data units, respective uplink MU-MIMO data units from the first communication device and the second communication device, in various embodiments. In an embodiment, the uplink MU-MIMO data unit is the uplink MU-MIMO data unit 616. In an embodiment, each uplink MU-MIMO data unit includes i) a respective second aggregate media access control protocol data unit, and ii) an acknowledgment of the corresponding first aggregate media access control protocol data unit. In some embodiments, the access point receives the uplink MU-MIMO data units simultaneously.

In an embodiment, the access point transmits a clear to send to self (CTS-to-Self) frame that indicates a length of a transmission opportunity (TXOP) of the access point. In an embodiment, the CTS-to-Self frame is the CTS-to-Self frame 610. The respective downlink MU-MIMO data units are transmitted during the TXOP and the respective uplink MU-MIMO data units are received during the TXOP, in an embodiment.

In another embodiment, the access point transmits a request to send (RTS) message to the first communication device, where the RTS message indicates a TXOP of the access point. In an embodiment, the RTS message is the RTS message 710. In an embodiment, the access point receives, from the first communication device and in response to the RTS message, a clear to send (CTS) frame that indicates a remaining length of the TXOP. The respective downlink MU-MIMO data units are transmitted during the TXOP after receipt of the CTS frame and the respective uplink MU-MIMO data units are received during the TXOP, in an embodiment.

Further aspects of the present invention relate to one or more of the following clauses.

In an embodiment, a method includes: receiving an uplink traffic characteristic information signal from each of a plurality of communication devices; selecting multiple communication devices of the plurality of communication devices as members of a client uplink group based at least on traffic information indicated by the respective uplink traffic characteristic information signals; transmitting an uplink group definition frame to each member of the client uplink group, the uplink group definition frame indicating an uplink multi-user multiple input multiple output (MU-MIMO) transmission schedule for the client uplink group for members of the client uplink group to simultaneously transmit to an access point; and triggering the members of the client uplink group to transmit uplink data frames simultaneously.

In other embodiments, the method includes any suitable combination of one or more of the following features.

The uplink group definition frame includes at least one of i) station identifiers (AIDs) of the members of the client uplink group, ii) a start time of the uplink MU-MIMO transmission schedule, iii) a duration of the uplink MU-MIMO transmission schedule, or iv) an interval between transmissions of the uplink MU-MIMO transmission schedule.

The uplink traffic characteristic information signal includes at least one of i) a proposed service interval to be used for the uplink MU-MIMO transmission schedule, ii) a proposed access category data rate to be used for the uplink MU-MIMO transmission schedule, or iii) traffic burst information to be used for the uplink MU-MIMO transmission schedule.

The uplink traffic characteristic information signal includes at least one of i) a proposed service interval to be used for the uplink MU-MIMO transmission schedule, ii) a proposed access category data rate to be used for the uplink MU-MIMO transmission schedule, or iii) traffic burst information to be used for the uplink MU-MIMO transmission schedule.

The method further includes transmitting a communication frame to the plurality of communication devices to prompt transmission of the respective uplink traffic characteristic information signals, where the communication frame includes a poll indication for members of the client uplink group.

The method further includes receiving the respective uplink traffic characteristic information signals through EDCA procedures.

The uplink MU-MIMO feedback frames are management frames.

The method further includes transmitting a communication frame to the client uplink group to prompt simultaneous transmission of independent uplink MU-MIMO data units by members of the client uplink group.

The communication frame includes an indication of a data unit size to be used for the independent uplink MU-MIMO data units.

The communication frame includes an indication of a maximum duration for a transmission period in which both the independent uplink MU-MIMO data units and corresponding downlink acknowledgments are to be transmitted if a maximum duration for a transmission period in which the downlink acknowledgments are to be transmitted is less than an extended interframe space.

The method further includes: simultaneously receiving the independent uplink MU-MIMO data units from the client uplink group; and transmitting a single group acknowledgment frame to the client uplink group. The single group acknowledgment frame has i) a broadcast address and ii) a station identifier (AID) and acknowledgment indicator of the received data and management frames for each member of the client uplink group.

The method further includes receiving an independent uplink MU-MIMO data unit from a member of the client uplink group while simultaneously receiving one or more other independent uplink MU-MIMO data units from one or more other members of the client uplink group; and transmitting a downlink MU-MIMO data unit to the member of the client uplink group. The downlink MU-MIMO data unit includes i) an acknowledgment for the uplink MU-MIMO data unit and ii) an aggregate media access control protocol data unit.

The method further includes: transmitting a trigger frame to a plurality of communication devices of the client uplink group to request the uplink traffic characteristic information signals; receiving the uplink traffic characteristic information signals from each of a plurality of communication devices; and selecting some or all of the members of the client uplink group for simultaneous uplink transmissions.

The method further includes transmitting an uplink trigger frame to the selected members for the simultaneous uplink transmissions.

The respective uplink traffic characteristic information signals are uplink MU-MIMO feedback frames that include an indication of available uplink data.

The uplink traffic characteristic information signal is a control frame.

In another embodiment, an apparatus includes a network interface device having one or more integrated circuits configured to: receive an uplink traffic characteristic information signal from each of a plurality of communication devices; select multiple communication devices of the plurality of communication devices as members of a client uplink group based at least on traffic information indicated by the respective uplink traffic characteristic information signals; and transmit an uplink group definition frame to each member of the client uplink group, the uplink group definition frame indicating an uplink multi-user multiple input multiple output (MU-MIMO) transmission schedule for the client uplink group for members of the client uplink group to simultaneously transmit to an access point.

In other embodiments, the apparatus includes any suitable combination of one or more of the following features.

The uplink group definition frame includes at least one of i) a start time of the uplink MU-MIMO transmission schedule, ii) a duration of the uplink MU-MIMO transmission schedule, or iii) an interval between transmissions of the uplink MU-MIMO transmission schedule.

The uplink traffic characteristic information signal includes at least one of i) a proposed service interval to be used for the uplink MU-MIMO transmission schedule, ii) a proposed access category data rate to be used for the uplink MU-MIMO transmission schedule, or iii) traffic burst information to be used for the uplink MU-MIMO transmission schedule.

The one or more integrated circuits are configured to transmit a communication frame to the client uplink group to prompt simultaneous transmission of independent uplink MU-MIMO data units by members of the client uplink group according to the uplink MU-MIMO transmission schedule.

The communication frame includes an indication of a maximum duration for a transmission period in which both the independent uplink MU-MIMO data units and corresponding downlink acknowledgments are to be transmitted if a maximum duration for a transmission period in which the downlink acknowledgments are to be transmitted is less than an extended interframe space.

The one or more integrated circuits are configured to: simultaneously receive the independent uplink MU-MIMO data units from the client uplink group; and transmit a single group acknowledgment frame to the client uplink group. The single group acknowledgment frame having i) a receiver address corresponding to a group identifier of the client uplink group and ii) a broadcast acknowledgment indicator for each member of the client uplink group.

The one or more integrated circuits are configured to: receive an independent uplink MU-MIMO data unit from a member of the client uplink group while simultaneously receiving one or more other independent uplink MU-MIMO data units from one or more other members of the client uplink group; and transmit a downlink MU-MIMO data unit to the member of the client uplink group. The downlink MU-MIMO data unit includes i) an acknowledgment for the uplink MU-MIMO data unit and ii) an aggregate media access control protocol data unit.

In an embodiment, a method includes receiving an enhanced request to send (E-RTS) message from a first communication device of a client uplink group. The E-RTS message includes i) a length of a transmission opportunity (TXOP) of the first communication device and ii) an indication of a data unit size for an uplink MU-MIMO data unit to be transmitted by the first communication device. The method further includes transmitting a communication frame to the first communication device and a second communication device of the client uplink group to cause a simultaneous transmission of respective uplink MU-MIMO data units from the first communication device and the second communication device. The communication frame includes the indication of the data unit size. The method also includes simultaneously receiving the respective uplink MU-MIMO data units. The uplink MU-MIMO data units having the indicated data unit size.

In other embodiments, the method includes any suitable combination of one or more of the following features.

The method further includes transmitting a single downlink MU-MIMO data unit to the first communication device and the second communication device. The downlink MU-MIMO data unit including i) an acknowledgment for the uplink MU-MIMO data unit from first communication device and ii) an acknowledgment for the uplink MU-MIMO data unit from the second communication device.

The method further includes selecting a data rate for the communication frame and the downlink MU-MIMO data unit based on members of the client uplink group.

The method further includes selecting a data rate for the communication frame and the downlink MU-MIMO data unit based on a data rate indication included in the RTS message from the first communication device.

In another embodiment, an apparatus includes a network interface device having one or more integrated circuits configured to receive an enhanced request to send (E-RTS) message from a first communication device of a client uplink group. The E-RTS message includes i) a length of a transmission opportunity (TXOP) of the first communication device and ii) an indication of a data unit size for an uplink MU-MIMO data unit to be transmitted by the first communication device. The one or more integrated circuits are configured to transmit a communication frame to the first communication device and a second communication device of the client uplink group to cause a simultaneous transmission of respective uplink MU-MIMO data units from the first communication device and the second communication device. The communication frame includes the indication of the data unit size. The one or more integrated circuits are also configured to simultaneously receive the respective uplink MU-MIMO data units, the uplink MU-MIMO data units having the indicated data unit size.

In other embodiments, the apparatus includes any suitable combination of one or more of the following features.

The one or more integrated circuits are configured to transmit a single downlink MU-MIMO data unit to the first communication device and the second communication device. The downlink MU-MIMO data unit includes i) an acknowledgment for the uplink MU-MIMO data unit from first communication device and ii) an acknowledgment for the uplink MU-MIMO data unit from the second communication device.

The one or more integrated circuits are configured to select a data rate for the communication frame and the downlink MU-MIMO data unit based on members of the client uplink group.

The one or more integrated circuits are configured to select a data rate for the communication frame and the downlink MU-MIMO data unit based on a data rate indication included in the RTS message from the first communication device.

In an embodiment, a method includes transmitting, by a communication device of a client uplink group, an enhanced request to send (E-RTS) message to an access point of a wireless local area network. The E-RTS message includes i) a length of a transmission opportunity (TXOP) of the communication device and ii) an indication of a data unit size for an uplink MU-MIMO data unit to be transmitted by the communication device simultaneously with transmissions of other members of the client uplink group. The method includes receiving a communication frame from the access point. The communication frame includes a prompt to transmit an uplink MU-MIMO data unit having the indicated data unit size. The method further includes: generating the uplink MU-MIMO data unit having the indicated data unit size; and transmitting, by the communication device and in response to the communication frame, the uplink MU-MIMO data unit to the access point during the TXOP simultaneously with transmissions of other members of the client uplink group.

In other embodiments, the method includes any suitable combination of one or more of the following features.

Generating the uplink MU-MIMO data unit includes generating the uplink MU-MIMO data unit to include an additional E-RTS message that includes i) a remainder of the TXOP length and ii) an indication of a data unit size for another uplink MU-MIMO data unit to be transmitted by the communication device.

The method further includes receiving a group acknowledgment frame from the access point during the TXOP. The group acknowledgment frame includes respective acknowledgments for i) the uplink MU-MIMO data unit transmitted by the communication device and ii) another uplink MU-MIMO data unit transmitted by another communication device of the client uplink group. The method also includes: generating an additional uplink MU-MIMO data unit having the indicated data unit size after receipt of the group acknowledgment frame; and transmitting, by the communication device and in response to the communication frame, the additional uplink MU-MIMO data unit to the access point during the TXOP simultaneously with transmissions of other members of the client uplink group.

In another embodiment, a communication device of a client uplink group includes a network interface device having one or more integrated circuits configured to transmit an enhanced request to send (E-RTS) message to an access point of a wireless local area network. The E-RTS message includes i) a length of a transmission opportunity (TXOP) of the communication device and ii) an indication of a data unit size for an uplink MU-MIMO data unit to be transmitted by the communication device simultaneously with transmissions of other members of the client uplink group. The one or more integrated circuits are configured to receive a communication frame from the access point. The communication frame includes a prompt to transmit an uplink MU-MIMO data unit having the indicated data unit size. The one or more integrated circuits are configured to: generate the uplink MU-MIMO data unit having the indicated data unit size; and transmit, in response to the communication frame, the uplink MU-MIMO data unit to the access point during the TXOP simultaneously with transmissions of other members of the client uplink group.

In other embodiments, the apparatus includes any suitable combination of one or more of the following features.

The one or more integrated circuits are configured to generate the uplink MU-MIMO data unit to include an additional E-RTS message that includes i) a remainder of the TXOP length and ii) an indication of a data unit size for another uplink MU-MIMO data unit to be transmitted by the communication device.

The one or more integrated circuits are configured to receive a group acknowledgment frame from the access point during the TXOP. The group acknowledgment frame includes respective acknowledgments for i) the uplink MU-MIMO data unit transmitted by the communication device and ii) another uplink MU-MIMO data unit transmitted by another communication device of the client uplink group. The one or more integrated circuits are configured to: generate an additional uplink MU-MIMO data unit having the indicated data unit size after receipt of the group acknowledgment frame; and transmit, in response to the communication frame, the additional uplink MU-MIMO data unit to the access point during the TXOP simultaneously with transmissions of other members of the client uplink group.

In an embodiment, a method includes transmitting, by an access point, respective downlink MU-MIMO data units to a first communication device of a client uplink group and a second communication device of the client uplink group. Each downlink MU-MIMO data unit includes i) a respective first aggregate media access control protocol data unit, and ii) a communication signal to prompt transmission of an independent uplink MU-MIMO data unit by the corresponding communication device of the client uplink group. The downlink MU-MIMO data units are transmitted simultaneously. The method includes receiving, in response to the respective downlink MU-MIMO data units, respective uplink MU-MIMO data units from the first communication device and the second communication device. Each uplink MU-MIMO data unit includes i) a respective second aggregate media access control protocol data unit, and ii) an acknowledgment of the corresponding first aggregate media access control protocol data unit. The uplink MU-MIMO data units are received simultaneously.

In other embodiments, the method includes any suitable combination of one or more of the following features.

The method further includes transmitting a clear to send to self (CTS-to-Self) frame that indicates a length of a transmission opportunity (TXOP) of the access point. The respective downlink MU-MIMO data units are transmitted during the TXOP and the respective uplink MU-MIMO data units are received during the TXOP.

The method further includes transmitting a request to send (RTS) message to the first communication device. The RTS message indicates a TXOP of the access point. The method includes receiving, from the first communication device and in response to the RTS message, a clear to send (CTS) frame that indicates a remaining length of the TXOP. The respective downlink MU-MIMO data units are transmitted during the TXOP after receipt of the CTS frame. The respective uplink MU-MIMO data units are received during the TXOP.

In another embodiment, an apparatus includes a network interface device having one or more integrated circuits configured to transmit respective downlink MU-MIMO data units to a first communication device of a client uplink group and a second communication device of the client uplink group. Each downlink MU-MIMO data unit includes i) a respective first aggregate media access control protocol data unit, and ii) a communication signal to prompt transmission of an independent uplink MU-MIMO data unit by the corresponding communication device of the client uplink group. The downlink MU-MIMO data units are transmitted simultaneously. The one or more integrated circuits configured to receive, in response to the respective downlink MU-MIMO data units, respective uplink MU-MIMO data units from the first communication device and the second communication device. Each uplink MU-MIMO data unit includes i) a respective second aggregate media access control protocol data unit, and ii) an acknowledgment of the corresponding first aggregate media access control protocol data unit. The uplink MU-MIMO data units are received simultaneously.

In other embodiments, the apparatus includes any suitable combination of one or more of the following features.

The one or more integrated circuits are configured to transmit a clear to send to self (CTS-to-Self) frame that indicates a length of a transmission opportunity (TXOP) of the access point. The respective downlink MU-MIMO data units are transmitted during the TXOP and the respective uplink MU-MIMO data units are received during the TXOP.

The one or more integrated circuits are configured to: transmit a request to send (RTS) message to the first communication device. The RTS message indicating a TXOP of the access point. The one or more integrated circuits configured to receive, from the first communication device and in response to the RTS message, a clear to send (CTS) frame that indicates a remaining length of the TXOP. The respective downlink MU-MIMO data units are transmitted during the TXOP after receipt of the CTS frame and the respective uplink MU-MIMO data units are received during the TXOP.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
transmitting, by a first communication device, a polling communication frame that is configured to trigger a plurality of second communication devices to transmit respective feedback information that indicates respective amounts of data that the respective second communication devices have to transmit to the first communication device, wherein the polling communication frame includes a duration field that is set to indicate a transmit opportunity period (TXOP) of the first communication device, the TXOP including the polling communication frame and indicating a period during which an uplink multi-user transmission is to occur;
receiving, at the first communication device, the respective feedback information from the plurality of second communication devices during the TXOP;
based on the respective feedback information, selecting, at the first communication device, a group of second communication devices that are to transmit simultaneously during the TXOP as part of the uplink multi-user transmission;
transmitting, by the first communication device, a trigger communication frame during the TXOP to trigger the group of second communication devices to transmit simultaneously as part of the uplink multi-user transmission; and
receiving, at the first communication device, the uplink multi-user transmission during the TXOP, wherein the uplink multi-user transmission is responsive to trigger communication frame and includes respective simultaneous individual transmissions from respective second communication devices among the group of second communication devices.

2. The method of claim 1, further comprising:
transmitting, by the first communication device, a block acknowledgment frame to the second communication devices that participated in the uplink multi-user transmission, wherein the block acknowledgment frame is responsive to the uplink multi-user transmission, and wherein the block acknowledgment frame includes a group identifier corresponding to the second communication devices that participated in the uplink multi-user transmission.

3. The method of claim 1, further comprising:
transmitting, by the first communication device, respective acknowledgment frames to the second communication devices that participated in the uplink multi-user transmission, wherein the respective acknowledgment frames are responsive to the uplink multi-user transmission.

4. The method of claim 1, wherein the respective feedback information includes at least one of i) a respective proposed service interval, ii) a respective proposed access category data rate, and iii) respective traffic burst information.

5. The method of claim 1, further comprising:
transmitting, by the first communication device, a downlink multi-user transmission during the TXOP.

6. The method of claim 1, wherein:
the trigger communication frame is a first trigger communication frame;
the uplink multi-user transmission is a first uplink multi-user transmission; and
the method further comprises:
transmitting, by the first communication device, a second trigger communication frame during the TXOP, wherein the second trigger communication frame is configured to trigger the group of second communication devices to transmit simultaneously as part of a second uplink multi-user transmission, and
receiving, at the first communication device, the second uplink multi-user transmission during the TXOP, wherein the second uplink multi-user transmission is responsive to the second trigger communication frame and includes respective simultaneous individual transmissions from respective second communication devices among the group of second communication devices.

7. The method of claim 1, wherein:
the respective feedback information includes respective indications of respective amounts of data in respective queues of respective second communication devices corresponding to data that is to be transmitted to the first communication device; and
selecting the group of second communication devices comprises using the respective indications of the respective amounts of data in the respective queues of the respective second communication devices to select the group of second communication devices.

8. The method of claim 7, wherein:
each of at least some of the queues correspond to data in i) a particular traffic category, ii) a particular traffic stream, or iii) a particular traffic identifier.

9. The method of claim 1, wherein:
the uplink multi-user transmission is a first uplink multi-user transmission; and
receiving the respective feedback information from the plurality of second communication devices during the TXOP comprises receiving the respective feedback information in a second uplink multi-user transmission that is responsive to the polling communication frame, wherein the second uplink multi-user transmission includes respective feedback frames from the plurality of second communication devices.

10. The method of claim 9, wherein:
each feedback frame includes a respective media access control (MAC) header having a respective indication of a respective amount of data to be transmitted to the first communication device; and
selecting the group of second communication devices that are to transmit simultaneously during the TXOP as part of the second uplink multi-user transmission comprises using the respective indications of the respective amounts of data to be transmitted to the first communication device to select the group of second communication devices.

11. The method of claim 10, wherein:
the respective indication of the respective amount of data to be transmitted to the first communication device is included in a respective quality of service (QoS) field in the respective MAC header.

12. A first communication device, comprising:
a network interface device including:
one or more integrated circuit (IC) devices, and
a plurality of transceivers implemented at least partially on the one or more IC devices;
wherein the one or more IC devices are configured to:
transmit a polling communication frame that is configured to trigger a plurality of second communication devices to transmit respective feedback information that indicates respective amounts of data that the respective second communication devices have to transmit to the first communication device, wherein the polling communication frame includes a duration field that is set to indicate a transmit opportunity period (TXOP) of the first communication device, the TXOP including the polling communication frame and indicating a period during which an uplink multi-user transmission is to occur,
receive the respective feedback information from the plurality of second communication devices during the TXOP,
based on the respective feedback information, select a group of second communication devices that are to transmit simultaneously during the TXOP as part of the uplink multi-user transmission,
transmit a trigger communication frame during the TXOP to trigger the group of second communication devices to transmit simultaneously as part of the uplink multi-user transmission, and
receive the uplink multi-user transmission during the TXOP, wherein the uplink multi-user transmission is responsive to the trigger communication frame and includes respective simultaneous individual transmissions from respective second communication devices among the group of second communication devices.

13. The first communication device of claim 12, wherein the one or more IC devices are further configured to:
transmit a block acknowledgment frame to the second communication devices that participated in the uplink multi-user transmission, wherein the block acknowledgment frame is responsive to the uplink multi-user transmission, and wherein the block acknowledgment frame includes a group identifier corresponding to the second communication devices that participated in the uplink multi-user transmission.

14. The first communication device of claim 12, wherein the one or more IC devices are further configured to:
transmit respective acknowledgment frames to the second communication devices that participated in the uplink multi-user transmission, wherein the respective acknowledgment frames are responsive to the uplink multi-user transmission.

15. The first communication device of claim 12, wherein:
the respective feedback information includes respective traffic characteristic information from respective second communication devices among the plurality of second communication devices; and
the one or more IC devices are further configured to: select the group of second communication devices using the respective traffic characteristic information.

16. The first communication device of claim 12, wherein the one or more IC devices are further configured to:
transmit a downlink multi-user transmission during the TXOP.

17. The first communication device of claim 12, wherein:
the trigger communication frame is a first trigger communication frame;
the uplink multi-user transmission is a first uplink multi-user transmission; and
the one or more IC devices are further configured to:
transmit a second trigger communication frame during the TXOP, wherein the second trigger communication frame is configured to trigger the group of two or more second communication devices to transmit simultaneously as part of a second uplink multi-user transmission, and
receive the second uplink multi-user transmission during the TXOP, wherein the second uplink multi-user transmission is responsive to the second trigger communication frame and includes respective simultaneous individual transmissions from respective second communication devices among the group of second communication devices.

18. The first communication device of claim 12, further comprising:
a plurality of antennas coupled to the plurality of transceivers.

19. The first communication device of claim 12, wherein:
the respective feedback information includes respective indications of respective amounts of data in respective queues of respective second communication devices corresponding to data that is to be transmitted to the first communication device; and
the one or more IC devices are further configured to: select the group of second communication devices using the respective indications of the respective amounts of data in the respective queues of the respective second communication devices.

20. The first communication device of claim 19, wherein:
each of at least some of the queues correspond to data in i) a particular traffic category, ii) a particular traffic stream, or iii) a particular traffic identifier.

21. The first communication device of claim 12, wherein:
the uplink multi-user transmission is a first uplink multi-user transmission; and
the one or more IC devices are further configured to: receive the respective feedback information in a second uplink multi-user transmission that is responsive to the polling communication frame, wherein the second uplink multi-user transmission includes respective feedback frames from the plurality of second communication devices.

22. The first communication device of claim 21, wherein:
each feedback frame includes a respective media access control (MAC) header having a respective indication of a respective amount of data to be transmitted to the first communication device; and
the one or more IC devices are further configured to: select the group of second communication devices that are to transmit simultaneously during the TXOP as part of the second uplink multi-user transmission using the respective indications of the respective amounts of data to be transmitted to the first communication device.

23. The first communication device of claim 22, wherein:
the respective indication of the respective amount of data to be transmitted to the first communication device is included in a respective quality of service (QoS) field in the respective MAC header.

* * * * *